US011431005B2

(12) United States Patent
Nakata et al.

(10) Patent No.: US 11,431,005 B2
(45) Date of Patent: Aug. 30, 2022

(54) HIGH-TEMPERATURE OPERATING FUEL CELL SYSTEM

(71) Applicant: Panasonic Intellectual Property Management Co., Ltd., Osaka (JP)

(72) Inventors: Hideki Nakata, Kyoto (JP); Kunihiro Ukai, Nara (JP); Masakazu Aoki, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 451 days.

(21) Appl. No.: 15/936,516

(22) Filed: Mar. 27, 2018

(65) Prior Publication Data

US 2018/0294490 A1  Oct. 11, 2018

(30) Foreign Application Priority Data

Apr. 7, 2017  (JP) .............................. JP2017-076648

(51) Int. Cl.
*H01M 8/04014* (2016.01)
*H01M 8/04007* (2016.01)
(Continued)

(52) U.S. Cl.
CPC ... *H01M 8/04022* (2013.01); *H01M 8/04014* (2013.01); *H01M 8/04067* (2013.01);
(Continued)

(58) Field of Classification Search
CPC ......... H01M 8/04022; H01M 8/04014; H01M 8/04776; H01M 8/04089; H01M 8/04303;
(Continued)

(56) References Cited

U.S. PATENT DOCUMENTS 5,998,053 A * 12/1999 Diethelm ............ H01M 8/0625
429/429
9,242,573 B2 * 1/2016 Lee ......................... B60L 58/30
(Continued)

FOREIGN PATENT DOCUMENTS

EP       2755268 A1    7/2014
JP    2003-017103      1/2003
(Continued)

OTHER PUBLICATIONS

The Extended European Search Report dated Jun. 7, 2018 for the related European Patent Application No. 18163048.4.

*Primary Examiner* — Christian Roldan
(74) *Attorney, Agent, or Firm* — McDermott Will & Emery LLP

(57) ABSTRACT

Disclosed is a high-temperature operating fuel cell system including: a fuel cell stack; a combustor that combusts a cathode off-gas and an anode off-gas; a heat insulator that covers at least part of the fuel cell stack and at least part of the combustor; a first preheater that covers at least part of the heat insulator and preheats an oxidant gas; an oxidant gas feeder that supplies the oxidant gas to the first preheater; a vacuum heat insulator that covers at least part of the first preheater; a sensor that detects information indicating stopping of a power generation operation; and a controller. When a determination is made that the power generation has stopped, the controller controls the oxidant gas feeder to supply the oxidant gas to the first preheater so that the temperature of the vacuum heat insulator is equal to or lower than a prescribed temperature.

13 Claims, 8 Drawing Sheets

(51) Int. Cl.
  H01M 8/04537    (2016.01)
  H01M 8/04664    (2016.01)
  H01M 8/04701    (2016.01)
  H01M 8/04746    (2016.01)
  H01M 8/0612     (2016.01)
  H01M 8/04089    (2016.01)
  H01M 8/04303    (2016.01)
  H01M 8/04313    (2016.01)
  H01M 8/0432     (2016.01)
  H01M 8/0438     (2016.01)
  H01M 8/04955    (2016.01)
  H01M 8/1246     (2016.01)
  H01M 8/2425     (2016.01)
  H01M 8/12       (2016.01)

(52) U.S. Cl.
  CPC ... *H01M 8/04089* (2013.01); *H01M 8/04303* (2016.02); *H01M 8/04313* (2013.01); *H01M 8/04365* (2013.01); *H01M 8/04388* (2013.01); *H01M 8/04619* (2013.01); *H01M 8/04679* (2013.01); *H01M 8/04731* (2013.01); *H01M 8/04753* (2013.01); *H01M 8/04776* (2013.01); *H01M 8/04955* (2013.01); *H01M 8/0618* (2013.01); *H01M 8/1246* (2013.01); *H01M 8/2425* (2013.01); *H01M 2008/1293* (2013.01)

(58) Field of Classification Search
  CPC ......... H01M 8/04313; H01M 8/04365; H01M 8/04388; H01M 8/04679; H01M 8/04731; H01M 8/04753; H01M 8/04955; H01M 8/0618; H01M 8/1246; H01M 8/2425; H01M 8/04067; H01M 8/04619; H01M 2008/1293
  USPC ...................................................... 429/423
  See application file for complete search history.

(56) References Cited

U.S. PATENT DOCUMENTS

| | | | | |
|---|---|---|---|---|
| 2003/0054215 | A1* | 3/2003 | Doshi | H01M 8/04014 |
| | | | | 429/423 |
| 2006/0251939 | A1* | 11/2006 | Bandhauer | H01M 8/04708 |
| | | | | 429/435 |
| 2009/0092883 | A1* | 4/2009 | Ozeki | H01M 8/0612 |
| | | | | 429/425 |
| 2010/0227233 | A1 | 9/2010 | Yamamoto et al. | |
| 2012/0178003 | A1* | 7/2012 | Venkataraman | H01M 8/2432 |
| | | | | 429/408 |

FOREIGN PATENT DOCUMENTS

| | | |
|---|---|---|
| JP | 2009-099437 A | 5/2009 |
| JP | 2009-140917 A | 6/2009 |
| JP | 2009-170170 | 7/2009 |

* cited by examiner

HIGH-TEMPERATURE OPERATING FUEL CELL SYSTEM

BACKGROUND

1. Technical Field

The present disclosure relates to a high-temperature operating fuel cell system that operates at high temperature.

2. Description of the Related Art

Fuel cells, even though they are compact, have high power generation efficiency. Since heat generated during power generation or heat of exhaust gas resulting from combustion of off-gas discharged from the fuel cells can be utilized, overall power generation efficiency can be increased. Therefore, the development of fuel cell systems that can utilize waste heat effectively is in progress. For example, in previously proposed fuel cell systems, the power generation reaction in the solid oxide fuel cells is stabilized, and the overall efficiency is improved (for example, Japanese Unexamined Patent Application Publication No. 2009-170170 and Japanese Patent No. 3913008).

In the structure of the solid oxide fuel cell system according to Japanese Unexamined Patent Application Publication No. 2009-170170, core vacuum insulation cans (vacuum heat insulators) and heat insulators (a heat-insulating material) are disposed to improve the heat insulation properties of a heat insulating container that contains a fuel cell assembly, a heat exchanger unit, etc. With this structure of the above solid oxide fuel cell system, heat dissipation to the outside of the heat insulating container can be reduced.

In the structure of the solid oxide fuel cell (SOFC) system according to Japanese Patent No. 3913008, exhaust fuel discharged from the SOFC is completely combusted in a combustor, and the exhaust gas discharged from the combustor is subjected to heat exchange with a first air preheater, a second air preheater, and an evaporator. With this structure of the above fuel cell system, the heat recovered by the first air preheater, the second air preheater, etc. can be utilized to preheat air introduced from the outside, and the efficiency of the fuel cell system can be increased.

SUMMARY

One non-limiting and exemplary embodiment provides a highly reliable high-temperature operating fuel cell system in which the amount of heat dissipated to the outside is reduced to improve the power generation efficiency of the system.

In one general aspect, the techniques disclosed here feature a high-temperature operating fuel cell system comprising: a fuel cell stack that includes a cathode and an anode and generates electric power through an electrochemical reaction of an oxidant gas supplied to the cathode and a reformed gas supplied to the anode; a combustor that combusts a cathode off-gas discharged from the cathode of the fuel cell stack and an anode off-gas discharged from the anode; a heat insulator that surrounds at least part of an outer surface of the fuel cell stack and at least part of the combustor; a first preheater that covers at least part of an outer surface of the heat insulator and preheats the oxidant gas to be supplied to the fuel cell stack using heat transferred through the heat insulator; an oxidant gas feeder that supplies the oxidant gas to the first preheater; a vacuum heat insulator that covers at least part of an outer surface of the first preheater; a sensor that detects information indicating stopping of a power generation operation of the fuel cell stack; and a controller, wherein, when the controller determines, based on a detection result from the sensor, that the power generation operation of the fuel cell stack has stopped, the controller controls the oxidant gas feeder to supply the oxidant gas to the first preheater so that the temperature of the vacuum heat insulator is equal to or lower than a prescribed temperature.

The high-temperature operating fuel cell system according to the above aspect of the present disclosure is configured as described above. This allows the amount of heat dissipated to the outside to be reduced, and an improvement in power generation efficiency and an improvement in reliability are advantageously achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
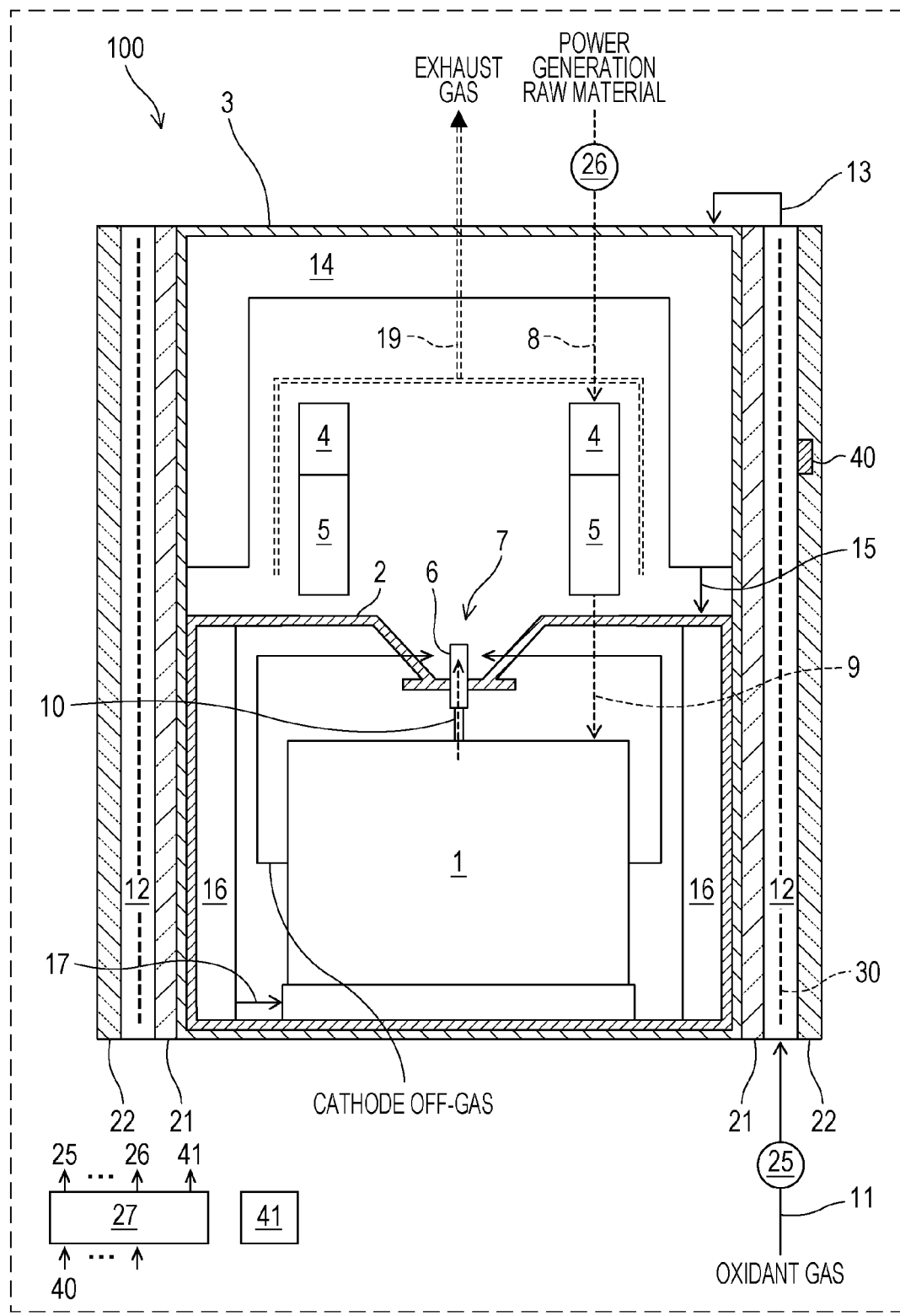
FIG. 1 is a schematic diagram showing an example of a principal structure of a high-temperature operating fuel cell system according to embodiment 1 of the present disclosure.

Underlying Knowledge Forming Basis of the Present Disclosure

The present inventors have conducted extensive studies on a solid oxide fuel cell system (hereinafter referred to as an SOFC system), which is an example of a high-temperature operating fuel cell that can effectively utilize exhaust heat. As a result, the inventors have obtained the following findings.

The above-described SOFC system according to Japanese Unexamined Patent Application Publication No. 2009-170170 has a structure in which the core vacuum insulation cans and the heat insulators are disposed along the inner surface of an outer wall of the heat insulating container main body. However, the inventors have found that this structure has a problem in that the temperature of the outer walls is still high and the heat insulation performance is not sufficient. To sufficiently reduce the amount of heat dissipated to the outside in this SOFC system, it is necessary to increase the thickness of the heat-insulators, and it is therefore difficult to reduce the size of the SOFC system. Another problem occurs when the core vacuum insulation cans is formed of a metal such as SUS. Specifically, if the surface temperature of the vacuum heat insulating container itself is increased to, for example, 500° C. or higher during operation of the SOFC system, the durability of the core vacuum insulation cans cannot be ensured sufficiently.

In the SOFC system according to Japanese Patent No. 3913008, the heat of the exhaust gas is recovered, and this can improve the power generation efficiency of the SOFC system. However, the inventors have found that this SOFC system has a problem in that the power generation efficiency cannot be improved significantly because the amount of heat dissipated from the inside of the SOFC system to the outside cannot be reduced sufficiently.

In view of the problems in the related art, the present inventors have conducted repeated studies and found the following. In order to reduce the size of an SOFC system by reducing the thickness of the heat insulators as much as possible and to achieve an improvement in power generation efficiency by reducing the amount of heat dissipated from the inside of the SOFC system to the outside, it is necessary to provide, in addition to the heat insulators, a mechanism for improving the heat insulating performance significantly to the SOFC system.

Specifically, the inventors have used a combination of a heat insulator, a vacuum heat insulator, and preheaters that preheat an oxidant gas that is to be supplied to the SOFC system and recovers the heat in the SOFC system, with these components arranged appropriately. Specifically, in the above structure, the outer surface of a casing that contains the fuel cell stack, the combustor, etc. is covered sequentially with the heat insulator, the preheaters, and the vacuum heat insulator. The inventors have found that, with this structure, a significant improvement in heat insulating performance can be achieved.

In this structure, since the heat insulator disposed along the outer wall of the casing can have a reduced thickness, the SOFC system can be reduced in size. In this structure, the surface temperature of the heat insulator disposed along the outer wall etc. of the casing can be reduced, and therefore the service life of the heat insulator can be ensured, so that the reliability of the system can be improved. In this structure, by controlling the flow rate of the oxidant gas (air) supplied to the SOFC, its heat recovery performance and heat insulating performance can be controlled.

With the above-described structure found by the present inventors, heat dissipation during power generation by the high-temperature operating fuel cell system can be reduced, so that the efficiency of power generation can be significantly improved. However, if the power generation operation of the high-temperature operating fuel cell system stops with its interior temperature being high, the interior temperature of the vacuum heat insulator increases rapidly because the thermal conductivity of the vacuum heat insulator is low. The inventors have found that, when the interior temperature of the vacuum heat insulator exceeds its allowable temperature, the vacuum heat insulator may deteriorate, and this causes deterioration in heat insulating performance.

The inventors have conducted extensive studies on the stopping of the operation of the high-temperature operating fuel cell system having the above-described structure. The inventors have found that the deterioration of the vacuum heat insulator can be prevented by appropriately controlling the oxidant gas feeder that supplies the oxidant gas to the high-temperature operating fuel cell. Thus, the inventors have arrived at the following aspects of the present disclosure.

Specifically, suppose that the power generation operation of the high-temperature operating fuel cell has stopped. When the temperature inside the casing containing the fuel cell stack, the combustor, etc. is high, the oxidant gas feeder is controlled such that the oxidant gas flows through the preheaters located inward of the vacuum heat insulator for a prescribed time. The inventors have found that, by controlling the oxidant gas feeder as described above, a steep increase in the interior temperature of the vacuum heat insulator can be prevented, so that the performance and reliability of the vacuum heat insulator can be maintained.

The above findings by the present inventors have not been known and have a novel technical feature having significant operational advantages. Specifically, the present disclosure provides the following aspects.

To solve the above problems, a high-temperature operating fuel cell system according to a first aspect of the present disclosure comprises: a fuel cell stack that includes a cathode and an anode and generates electric power through an electrochemical reaction of an oxidant gas supplied to the cathode and a reformed gas supplied to the anode; a combustor that combusts a cathode off-gas discharged from the cathode of the fuel cell stack and an anode off-gas discharged from the anode; a heat insulator that surrounds at least part of an outer surface of the fuel cell stack and at least part of the combustor; a first preheater that covers at least part of an outer surface of the heat insulator and preheats the oxidant gas to be supplied to the fuel cell stack using heat transferred through the heat insulator; an oxidant gas feeder that supplies the oxidant gas to the first preheater; a vacuum heat insulator that covers at least part of an outer surface of the first preheater; a sensor that detects information indicating stopping of a power generation operation of the fuel cell stack; and a controller, wherein, when the controller determines, based on a detection result from the sensor, that the power generation operation of the fuel cell stack has stopped, the controller controls the oxidant gas feeder to supply the oxidant gas to the first preheater so that the temperature of the vacuum heat insulator is equal to or lower than a prescribed temperature.

In the above structure, since the heat insulator, the first preheater, and the vacuum heat insulator are provided, the amount of heat dissipated from the surface of the vacuum heat insulator to the outside can be reduced. Moreover, the heat transferred to the first preheater through the heat insulator can be recovered by the oxidant gas flowing through the first preheater and supplied to the fuel cell stack. As described above, the exhaust heat in the high-temperature operating fuel cell system can be efficiently recovered by the oxidant gas, and the oxidant gas preheated by the recovered heat can be supplied to the fuel cell stack, so that the power generation efficiency can be increased.

Moreover, when the controller determines that the power generation operation of the fuel cell stack has stopped, the controller controls the oxidant gas feeder to supply the oxidant gas to the first preheater. Therefore, the temperature of the vacuum heat insulator can be maintained within an allowable temperature range, and deterioration of the vacuum heat insulator can be prevented.

With the high-temperature operating fuel cell system according to the first aspect of the present disclosure, the amount of heat dissipated to the outside can be reduced, and an improvement in power generation efficiency and an improvement in reliability are advantageously achieved.

According to a second aspect of the present disclosure, in the high-temperature operating fuel cell system in the first aspect, wherein the sensor is a flame detector, and when the controller detects, based on the detection result from the sensor, that a combustion operation of the combustor, the controller may determine that the power generation operation of the fuel cell stack has stopped.

According to a third aspect of the present disclosure, in the high-temperature operating fuel cell system in the first aspect, wherein the sensor is a flow meter, and when the controller detects, based on the detection result from the sensor, that supply of the reformed gas has stopped, the controller may determine that the power generation operation of the fuel cell stack has stopped.

In the above structure, even when the power generation operation of the fuel cell stack is stopped by a problem such as a misfire during the combustion operation or by stopping of the supply of the reformed gas, the temperature of the vacuum heat insulator can be maintained within the allowable temperature range, and deterioration of the vacuum heat insulator can be prevented.

According to a fourth aspect of the present disclosure, in the high-temperature operating fuel cell system in the first to third aspects, when the controller determines, during supply of the oxidant gas from the oxidant gas feeder to the first preheater, that supply of electric power to the oxidant gas feeder has stopped, the controller may operate the oxidant gas feeder using electric power generated by the fuel cell stack or electric power from an external auxiliary power supply.

In the above structure, when a determination is made that the supply of electric power to the oxidant gas feeder has stopped, the oxidant gas feeder can be operated using the electric power generated by the fuel cell stack or the electric power from the auxiliary power supply. Since the oxidant gas feeder can be operated even when the supply of the electric power to oxidant gas feeder is stopped as described above, it is possible to prevent the occurrence of a situation in which the oxidant gas feeder is not operating and the temperature of the vacuum heat insulator cannot be maintained within the allowable temperature range.

This allows the reliability of the high-temperature operating fuel cell system to be improved.

According to a fifth aspect of the present disclosure, the high-temperature operating fuel cell system in any one of the first to fourth aspects may further comprise: a reformer that generates the reformed gas from a power generation raw material supplied, the reformed gas being generated through a reforming reaction by utilizing heat of an exhaust gas generated by combustion in the combustor; a second preheater that preheats the oxidant gas through heat exchange with the exhaust gas whose heat has been partially used for the reforming reaction in the reformer and supplies the preheated oxidant gas to the fuel cell stack; and a casing that contains the fuel cell stack, the combustor, the reformer, and the second preheater. The heat insulator may be located on an inner or outer surface of the casing and may surround at least part of the outer surface of the fuel cell stack, at least part of the combustor, at least part of an outer surface of the reformer, and at least part of an outer surface of the second preheater.

In the above structure, since the reformer is provided, the reformed gas can be produced from the power generation raw material and supplied to the fuel cell stack. Therefore, the power generation raw material used in the high-temperature operating fuel cell system can be selected from an increased number of choices.

Since the second preheater is provided, the oxidant gas to be supplied to the fuel cell stack can be preheated using the exhaust gas. Therefore, the temperature of the exhaust gas can be reduced sufficiently, and then the resulting exhaust gas can be discharged to the outside. In addition, the temperature of the oxidant gas can be increased.

With the high-temperature operating fuel cell system according to the fifth aspect, the efficiency of power generation can be further improved.

According to a sixth aspect of the present disclosure, in the high-temperature operating fuel cell system in any one of the first to fifth aspects, when the controller determines, based on the detection result from the sensor, that the power generation operation of the fuel cell stack has stopped, the controller may control the oxidant gas feeder such that the oxidant gas is supplied to the first preheater for a prescribed time or until the temperature of the vacuum heat insulator is equal to or lower than the prescribed temperature.

In the above structure, when the controller determines that the power generation operation of the fuel cell stack has stopped, the controller instructs the oxidant gas feeder to supply the oxidant gas to the first preheater for the prescribed time or until a determination is made that the temperature of the vacuum heat insulator is equal to or lower than the prescribed temperature. The controller can control the oxidant gas feeder to supply the oxidant gas to the first preheater such that the temperature of the vacuum heat insulator is certainly within the allowable range, so that the reliability of the high-temperature operating fuel cell system can be further improved.

According to a seventh aspect of the present disclosure, in the high-temperature operating fuel cell system in the fifth aspect, the reformer may be disposed above the combustor, and the fuel cell stack may be disposed below the combustor. The high-temperature operating fuel cell system may further comprise: a fuel cell stack container that has a container space containing the fuel cell stack and guides the cathode off-gas discharged from the cathode of the fuel cell stack to the combustor through the container space; and a third preheater that is disposed on a side surface of the fuel cell stack container so as to surround the outer surface of the fuel cell stack and further preheats the oxidant gas preheated in the second preheater using heat of the cathode off-gas flowing through the container space. The heat insulator may surrounds at least part of an outer surface of the third preheater, at least part of the combustor, and at least part of the outer surface of the reformer.

In the above configuration, the heat insulator is disposed so as to surround at least part of the outer surface of the third preheater, at least part of the combustor, and at least part of the outer surface of the reformer. Therefore, the heat recovery performance and the heat insulating performance by the first preheater and the vacuum heat insulator that cover the heat insulator can be further improved.

According to a eighth aspect of the present disclosure, in the high-temperature operating fuel cell system in the seventh aspect, the first preheater may include: a plurality of preheater sections that surround at least part of the outer surface of the third preheater, at least part of the combustor, and at least part of the outer surface of the reformer; and a connector that connects the plurality of preheater sections spaced apart from each other such that the oxidant gas is allowed to flow between the plurality of preheater sections.

In the above structure, the first preheater includes the plurality of preheater sections and the connector. Specifically, the first preheater includes preheater sections having different shapes suitable for different positions, and therefore the preheater sections can be appropriately disposed in their respective positions. Moreover, vacuum heat insulators that cover the preheater sections and have shapes suitable for the shapes and positions of the preheater sections can be appropriately disposed in their respective positions.

Therefore, the level of the heat insulating performance of the high-temperature operating fuel cell system and the level of its heat recovery performance can be freely controlled.

According to an ninth aspect of the present disclosure, in the high-temperature operating fuel cell system in the seventh or eighth aspect, the oxidant gas may flow sequentially through the first preheater, the second preheater, and the third preheater and be then supplied to the fuel cell stack, and the first preheater may preheat the oxidant gas supplied externally using the heat transferred through the heat insulator. The second preheater may preheat the oxidant gas preheated in the first preheater using the heat of the exhaust gas, and the third preheater may preheat the oxidant gas preheated in the second preheater using the heat of the cathode off-gas flowing through the container space of the fuel cell stack container.

In the above structure, the heat dissipated to the outside through the first to third preheaters can be effectively utilized to increase the temperature of the oxidant gas reliably. Therefore, the efficiency of power generation of the high-temperature operating fuel cell system can be further improved.

According to a tenth aspect of the present disclosure, in the high-temperature operating fuel cell system in any one of the first to ninth aspects, the vacuum heat insulator may be detachably disposed so as to be replaceable without disassembling the high-temperature operating fuel cell system.

The phrase "replaceable without disassembling the high-temperature operating fuel cell system" means that the vacuum heat insulator can be replaced without detaching components such as a pipe and a casing included in the high-temperature operating fuel cell system and without relocating them.

In the above structure, the vacuum heat insulator is detachably disposed so as to be replaceable without disassembling the high-temperature operating fuel cell system.

Therefore, when the performance of the vacuum heat insulator deteriorates because of the expiration of its service life or an increase in the temperature inside the casing due to stopping of the power generation by the fuel cell stack, the vacuum heat insulator can be replaced in a short time at low cost.

According to a eleventh aspect of the present disclosure, the high-temperature operating fuel cell system in the tenth aspect may further comprise: a temperature sensor that detects a temperature corresponding to a change in the temperature of the vacuum heat insulator; and an annunciator. The controller may include a storage that stores a temperature history detected by the temperature sensor, may make a determination, based on the temperature history stored in the storage, as to whether or not replacement of the vacuum heat insulator is necessary, and may send a result of the determination to the annunciator.

In this structure, the vacuum heat insulator of the high-temperature operating fuel cell system can be replaced at an appropriate timing, and the cost of parts and the cost of work can be significantly reduced.

According to a twelfth aspect of the present disclosure, the high-temperature operating fuel cell system in the eleventh aspect, the temperature sensor is the sensor that detects the information indicating stopping of the power generation operation of the fuel cell stack.

Embodiments of the present disclosure will next be described with reference to the drawings. In the embodiments of the present disclosure, an SOFC system including a solid oxide fuel cell (SOFC) as a power generator will be described as an example of a high-temperature operating fuel cell system 100, but this is not a limitation. For example, the high-temperature operating fuel cell system 100 may be an MCFC system including a molten carbonate fuel cell (MCFC) as the power generator or may be any fuel cell system that can effectively utilize high-temperature exhaust heat.

Embodiment 1

(Structure of High-Temperature Operating Fuel Cell System)

Referring first to FIG. 1, the structure of a high-temperature operating fuel cell system 100 according to embodiment 1 will be described. FIG. 1 is a schematic illustration showing an example of a principal structure of the high-temperature operating fuel cell system 100 according to embodiment 1 of the present disclosure. FIG. 1 shows the principal structure of the high-temperature operating fuel cell system 100 when it is viewed from a side. The high-temperature operating fuel cell system 100 may have a cylindrical shape or a cuboidal shape with the lower surface in the drawing sheet serving as a bottom surface and the upper surface serving as a top surface. In the present specification, a gas supplied from the outside through a power generation raw material supply passage 8 is referred to as a power generation raw material, and a power generation raw material reformed through a reforming reaction in a reformer 5 is referred to as a reformed gas.

The high-temperature operating fuel cell system 100 generates electric power through an electrochemical reaction of an oxidant gas such as air supplied from the outside and a reformed gas obtained by reforming the power generation raw material such as natural gas supplied from the outside. As shown in FIG. 1, the high-temperature operating fuel cell system 100 includes a fuel cell stack 1, a fuel cell stack container 2, a casing 3, an evaporator 4, the reformer 5, an injector 6, a combustor 7, the power generation raw material supply passage 8, a reformed gas passage 9, an anode off-gas passage 10, an oxidant gas supply passage 11, a first preheater 12, an oxidant gas supply passage 13 for the casing, a second preheater 14, a first oxidant gas passage 15, a third preheater 16, a second oxidant gas passage 17, an exhaust gas passage 19, a heat insulator 21, a vacuum heat insulator 22, an oxidant gas feeder 25, a power generation raw material feeder 26, a sensor 40, and a controller 27.

In the high-temperature operating fuel cell system 100, at least part of the outer surface of the casing 3 is covered with the heat insulator 21. As shown in FIG. 1, the heat insulator 21 may cover at least part of the outer side surface(s) of the casing 3. At least part of the outer surface of the heat insulator 21 is covered with the first preheater 12, and at least part of the outer surface of the first preheater 12 is covered with the vacuum heat insulator 22. In FIG. 1, the region in which the heat insulator 21 is disposed is the same as the region in which the first preheater 12 is disposed, but these regions are not necessarily the same. In FIG. 1, the region in which the first preheater 12 is disposed is the same as the region in which the vacuum heat insulator 22 is disposed, but these regions are not necessarily the same. Specifically, it is only necessary that the entire inner surface of the vacuum heat insulator 22 be in contact with the first preheater 12, and it is unnecessary that the entire first preheater 12 be covered. In terms of reliability, it is preferable that the first preheater 12 is present on the inner side of the vacuum heat insulator 22.

The casing 3 contains the fuel cell stack 1, the fuel cell stack container 2, the evaporator 4, the reformer 5, the injector 6, the combustor 7, the reformed gas passage 9, the anode off-gas passage 10, the second preheater 14, the first oxidant gas passage 15, the second oxidant gas passage 17, and the exhaust gas passage 19.

The structure inside the casing 3 will first be described. The fuel cell stack 1 is formed by stacking a plurality of single fuel cells each generating electric power through the electrochemical reaction of the oxidant gas supplied from the outside and the reformed gas generated through the reforming reaction in the reformer 5. For example, the fuel cell stack 1 may have a structure in which the plurality of stacked single cells are connected in series. The fuel cell stack 1 may be formed by stacking a plurality of flat plate-shaped fuel cells or may be formed by stacking a plurality of cylindrical fuel cells. In the high-temperature operating fuel cell system 100 according to embodiment 1, the fuel cell stack 1 operates at a high-temperature of about 600° C. or higher. The fuel cell stack 1 may include, for example, a temperature sensor that detects the operating temperature of the fuel cell stack 1 and an electrode used to collect the current generated in the fuel cell stack 1, although they are not illustrated.

The single cells included in the fuel cell stack 1 may be, for example, single fuel cells formed from yttria-doped zirconia (YSZ), zirconia doped with ytterbium or scandium, or a lanthanum gallate-based solid electrolyte. When the single fuel cells are formed from YSZ, the power generation reaction is performed within the temperature range of about 600 to about 900° C., which depends on the thickness of the cells.

The fuel cell stack container 2 is a container that contains the fuel cell stack 1. The fuel cell stack container 2 is formed from, for example, a refractory metal that exhibits heat resistance in the temperature range of 600° C. to 900° C. At least the side surface(s) of the fuel cell stack container 2 is(are) covered with the heat insulator 21 through the casing 3, and the first preheater 12 is disposed on the outer surface of the heat insulator 21 so as to cover the heat insulator 21. The vacuum heat insulator 22 is disposed on the outer surface of the first preheater 12 so as to cover the first preheater 12.

As shown in FIG. 1, the heat insulator 21, the first preheater 12, and the vacuum heat insulator 22 are disposed so as to cover a region of the side surface(s) of the casing 3 which region laterally surrounds at least the fuel cell stack container 2 and the combustor 7. The heat insulator 21, the first preheater 12, and the vacuum heat insulator 22 may cover a region of the side surface(s) of the casing 3 which region laterally surrounds the evaporator 4, the reformer 5, and the second preheater 14. The heat insulator 21, the first preheater 12, and the vacuum heat insulator 22 are disposed on the outer surface of the casing 3 so as to cover at least a region through which high-temperature heat is transferred.

In the high-temperature operating fuel cell system 100 according to embodiment 1, the heat insulator 21 is disposed on the outer side of the casing 3. However, the heat insulator 21 may be disposed on the inner side of the casing 3 or may be disposed on both the inner and outer sides of the casing 3 so as to sandwich the casing 3. When the casing 3 are sandwiched between the heat insulators 21, the material forming the heat insulator 21 on the inner side of the casing 3 may differ from the material forming the heat insulator 21 on the outer side.

The first preheater 12 may include a metal-made inner tube surrounding the heat insulator 21 and a metal-made outer tube surrounding the outer surface of the inner tube, and the oxidant gas may flow through the space formed between the inner tube and the outer tube. The details of the heat insulator 21 and the vacuum heat insulator 22 will be described later.

As shown in FIG. 1, in the fuel cell stack container 2, the cathode off-gas discharged from the cathode of the fuel cell stack 1 flows through the container space of the fuel cell stack 1. The third preheater 16 is disposed inside the fuel cell stack container 2. In the third preheater 16, heat is exchanged between the oxidant gas to be supplied to the cathode side of the fuel cell stack 1 and the cathode off-gas discharged from the fuel cell stack 1, and the oxidant gas can thereby be preheated. The third preheater 16 is disposed along the inner side wall surface(s) of the fuel cell stack container 2. In other words, the third preheater 16 is disposed inside the fuel cell stack container 2 so as to surround the outer side surface(s) of the fuel cell stack 1. The third preheater 16 may be configured similarly to the first preheater 12. Specifically, in the third preheater 16, a metal-made inner tube surrounds the side surface(s) of the fuel cell stack 1, and a metal made outer tube surrounds the outer surface of the inner tube. The oxidant gas flows through the space formed between the inner tube and the outer tube. The outer tube included in the third preheater 16 may serve also as the side wall(s) of the fuel cell stack container 2.

The injector 6 is used to inject the anode off-gas and is disposed in a central portion of the upper surface of the fuel cell stack container 2. The anode off-gas discharged from the anode of the fuel cell stack 1 flows through the anode off-gas passage 10 and is supplied to the injector 6.

As shown in FIG. 1, the central portion of the upper surface of the fuel cell stack container 2 is recessed so as to be tapered from the upper surface toward the bottom surface. This recess may form the combustor 7 that is a space for combustion of the anode off-gas and the cathode off-gas. The injector 6 is disposed at the center of the bottom of the recess so as to protrude upward and extend perpendicularly to the upper surface of the fuel cell stack container 2. The injector 6 may have, for example, a cylindrical shape, and a plurality of anode off-gas injection holes for injecting the anode off-gas may be provided on the side surface of the injector 6.

As described above, the high-temperature operating fuel cell system 100 is configured such that, during operation (power generation), the anode off-gas and the cathode off-gas not used for the power generation reaction are combusted in the combustor 7 to thereby generate a high-temperature exhaust gas and the heat of the exhaust gas is utilized effectively. This will be described in detail later. By appropriately arranging the heat insulator 21, the vacuum heat insulator 22, the first preheater 12, the second preheater 14, and the third preheater 16, the dissipation of heat from the inside of the casing 3 of the high-temperature operating fuel cell system 100 to the outside can be prevented as much as possible. This will also be described in detail later.

As shown in FIG. 1, in the high-temperature operating fuel cell system 100, the fuel cell stack 1 is disposed below the combustor 7, and the second preheater 14, the evaporator 4, and the reformer 5 are disposed above the combustor 7. The heat of the exhaust gas generated in the combustor 7 is utilized as the heat necessary for the reforming reaction in the reformer 5, the heat necessary for vaporization of water in the evaporator 4, and the heat necessary to preheat the oxidant gas in the second preheater 14.

The second preheater 14 preheats the oxidant gas through heat exchange between the oxidant gas and the exhaust gas whose heat has been partially used for the reforming reaction in the reformer 5 and supplies the preheated oxidant gas to the fuel cell stack 1. The second preheater 14 may be composed of a combination of two metal-made tubular members having different diameters and different axial lengths and each having an open bottom. The oxidant gas may flow through the space formed between the inner and outer tubular members.

The reformer 5 may generate the reformed gas from the power generation raw material through a partial oxidation reforming reaction. It is advantageous that the reformer 5 is capable of generating the reformed gas from the power generation raw material not only through the partial oxidation reforming reaction but also through a steam reforming reaction. When the reformer 5 generates the reformed gas from the power generation raw material through the partial oxidation reforming reaction, the evaporator 4 is not necessarily provided.

When the reformer 5 generates the reformed gas from the power generation raw material through the steam reforming reaction, the power generation raw material is mixed with water vaporized by the evaporator 4 disposed upstream of the reformer 5, and the mixture is supplied to the reformer 5. A reforming catalyst charged into the reformer 5 may be appropriately selected from an alumina-supported nickel catalyst ($Ni/Al_2O_3$), an alumina-supported ruthenium catalyst ($Ru/Al_2O_3$), etc.

The power generation raw material supplied to the reformer 5 may contain, as an odorant or a material originating from the raw material, a sulfur component. Therefore, a desulfurizer may be disposed upstream of the reformer 5 and the evaporator 4, and the power generation raw material desulfurized by the desulfurizer may be supplied to the reformer 5 and the evaporator 4.

In one example of the desulfurizer, a method in which the sulfur component contained in the power generation raw material is removed by hydrodesulfurization is used. A desulfurizing agent charged into the desulfurizer is, for example, a desulfurizing agent containing copper and zinc. The desulfurizing agent used is not limited to the above-described desulfurizing agent so long as the hydrodesulfurization can be performed. The desulfurizing agent used may be a combination of zinc oxide and a Ni—Mo-based or Co—Mo-based catalyst. When the desulfurizing agent is a combination of zinc oxide and a Ni—Mo-based or Co—Mo-based catalyst, organic sulfur in the power generation raw material is hydrocracked in the desulfurizer in the temperature range of 350 to 400° C. In the desulfurizer, the $H_2S$ generated is then removed by adsorption on ZnO in the temperature range of 350 to 400° C. For example, when the power generation raw material is town gas, the town gas contains, as an odorant, dimethyl sulfide ($C_2H_6S$, DMS), which is a sulfur compound. In the desulfurizer, the DMS is removed by the desulfurizing agent in the form of ZnS through reactions represented by formulas (1) and (2) or by physical adsorption on the desulfurizing agent.

$$C_2H_6S + 2H_2 \rightarrow 2CH_4 + H_2S \qquad (1)$$

$$H_2S + ZnO \rightarrow H_2O + ZnS \qquad (2)$$

The odorant contained in the power generation raw material may be a sulfur compound other than the DMS described above such as TBM ($C_4H_{10}S$) or THT ($C_4H_8S$).

When the desulfurizing agent charged contains copper and zinc, the desulfurizer performs desulfurization in the temperature range of about 10 to about 400° C. and preferably about 150 to about 300° C. The copper-zinc-based desulfurizing agent has, in addition to the hydrodesulfurization ability, physical adsorption ability. Physical adsorption is dominant at low temperature, and chemical adsorption ($H_2S + ZnO \rightarrow H_2O + ZnS$) is dominant at high temperature. In this case, the content of sulfur contained in the desulfurized power generation raw material is 1 vol. ppb (parts per billion) or less and generally 0.1 vol. ppb or less.

As described above, when the desulfurizer is charged with a Ni—Mo-based or Co—Mo-baes catalyst or a desulfurizing agent containing one of copper and zinc, the amount of the sulfur component removed per unit volume is large. Therefore, when the above-described desulfurizing agent is used, the amount of the desulfurizing agent necessary to reduce the sulfur concentration to a desired level can be small.

(Heat Insulator and Vacuum Heat Insulator)

The heat insulator 21 and the vacuum heat insulator 22 included in the high-temperature operating fuel cell system 100 will next be described in detail.

The heat-insulating material forming the heat insulator 21 is preferably a heat-insulating material that can withstand a high temperature of 600° C. or higher, and any general-purpose heat-insulating material can be used so long as it has heat resistance. Examples of the heat-insulating material forming the heat insulator 21 include glass wool, Superwool, rock wool, ceramic fibers, mineral wool, calcium silicate, and rigid polyurethane foams. A special heat-resistant heat-insulating material prepared by mixing fumed silica as a main component, an inorganic fibrous material, and an infrared shielding material may also be used.

The vacuum heat insulator 22 disposed on the outer side of the first preheater 12 may be a vacuum heat-insulating member (VIP: Vacuum Insulation Panel) including an outer casing formed from, for example, a metal- or resin-made laminate film and a core member formed from a porous structural material such as glass wool. The vacuum heat-insulating member is prepared by reducing the pressure inside the outer casing and then sealing the resulting outer casing.

The vacuum heat insulator 22 is disposed on the outer surface of the first preheater 12, i.e., at the outermost portion of the high-temperature operating fuel cell system 100. This allows the heat insulating performance to be improved significantly. The thermal conductivity when the vacuum heat insulator 22 is disposed on the outer surface of the first preheater 12 is about 1/10 to 1/20 of that when, for example, a general-purpose heat-insulating material such as glass wool is disposed on the outer surface of the first preheater 12. An outermost portion located outside the casing 3 is referred to as the outermost portion of fuel cell system 100. For example, in a region in which the casing 3 is covered sequentially with the heat insulator 21, the first preheater 12, and the vacuum heat insulator 22, a portion occupied by the vacuum heat insulator 22 is the outermost portion.

Therefore, when the vacuum heat insulator 22 is disposed on the outer surface of the first preheater 12, the thickness of the high-temperature operating fuel cell system 100 can be smaller than the thickness when a general-purpose heat-insulating material is disposed on the outer surface, and the high-temperature operating fuel cell system 100 can be reduced in size.

More specifically, the thickness of the vacuum heat insulator 22 can be computed from the thermal conductivity of the vacuum heat insulator 22 and the allowable amount of heat dissipation computed based on the power generation efficiency necessary for the high-temperature operating fuel cell system 100. For example, reference thermal conductivity values at about 100° C. to about 200° C. are as follows. The thermal conductivity of a general-purpose heat-insulating material such as glass wool is about 0.1 W/mK, and the thermal conductivity of a special heat-resistant heat-insulating material using fumed silica is about 0.024 W/mK. The thermal conductivity of the vacuum heat insulator is about 0.0012 W/mK. As can be seen from these results, when, instead of a heat insulator formed from a general-purpose heat-insulating material, the vacuum heat insulator 22 is disposed at the outermost portion of the high-temperature operating fuel cell system 100, the thickness of the vacuum heat insulator 22 can be reduced by a factor of, for example, at least 20.

The allowable temperature range of the vacuum heat-insulating material forming the vacuum heat insulator 22 varies depending on the material of the outer casing formed from a metal- or resin-made laminate film and the specifications of an adhesive. In particular, the maximum allowable temperature on a high-temperature side is often about 100° C. to about 200° C. The lower the service temperature of the vacuum heat insulator 22, the longer its service life.

In the high-temperature operating fuel cell system 100 according to embodiment 1, heat transferred from the fuel cell stack 1, the combustor 7, etc. through the heat insulator 21 can be recovered in the first preheater 12. Therefore, during the power generation operation of the high-temperature operating fuel cell system 100, the surface temperature on the outer side of the first preheater 12 is, for example, about 50° C. to about 200° C. Therefore, the service temperature of the vacuum heat insulator 22 is prevented from increasing, and the service life of the vacuum heat insulator 22 can be extended.

Specifically, in the high-temperature operating fuel cell system 100, even when the temperature of the outer surface of the casing 3 is high, i.e., 600° C. to 800° C., the temperature of the inner surface of the vacuum heat insulator 22 can be reduced to 200° C. or lower by adjusting the thickness of the heat insulator 21 or controlling the flow rate of the oxidant gas supplied to thereby adjust the amount of heat exchanged in the first preheater 12. Therefore, the vacuum heat insulator 22 is not exposed to a high temperature exceeding 200° C., and the service life of the vacuum heat insulator 22 can be extended significantly.

In the high-temperature operating fuel cell system 100, the vacuum heat insulator 22 is disposed at the outermost portion of the high-temperature operating fuel cell system. Suppose that the temperature of the outer surface of this high-temperature operating fuel cell system 100 is equal to the temperature of the outer surface of a high-temperature operating fuel cell system in which a metal-made first preheater 12 is disposed at its outermost portion. Even in this case, the sensible temperature of the high-temperature operating fuel cell system 100 can be lower because of the difference in thermal conductivity between the materials used.

When the first preheater 12 is capable of reducing the temperature of the outermost portion of the high-temperature operating fuel cell system 100 to a desired temperature and the amount of heat dissipated to the outside falls within an allowable range, the vacuum heat insulator 22 is not necessarily provided on the outer surface of the first preheater 12. In this case, the high-temperature operating fuel cell system 100 has a structure in which at least part of the outer surface of the casing is covered with the heat insulator 21 and the outer surface of the heat insulator 21 is covered with the first preheater 12.

In the high-temperature operating fuel cell system 100, the power generation raw material supplied from the outside is, for example, natural gas, but this is not a limitation. For example, the power generation raw material may be pure hydrogen such as a reformed gas. In a structure in which pure hydrogen serving as the power generation raw material is supplied from the outside to the high-temperature operating fuel cell system 100, it is unnecessary to provide the evaporator 4 and the reformer 5.

As described above, in the high-temperature operating fuel cell system 100, the casing 3 contains the fuel cell stack 1, the fuel cell stack container 2, the evaporator 4, the reformer 5, the injector 6, the combustor 7, the power generation raw material supply passage 8, the reformed gas passage 9, the anode off-gas passage 10, the second preheater 14, the first oxidant gas passage 15, the third preheater 16, the second oxidant gas passage 17, and the exhaust gas passage 19, and at least the side surface(s) of the casing 3 is(are) surrounded by the first preheater 12, the heat insulator 21, and the vacuum heat insulator 22.

As shown in FIG. 1, in the high-temperature operating fuel cell system 100, the second preheater 14, the first oxidant gas passage 15, and the third preheater 16 surround the evaporator 4, the reformer 5, the combustor 7, the fuel cell stack 1, the reformed gas passage 9, the anode off-gas passage 10, the exhaust gas passage 19, etc. within the casing 3. With this structure, the heat inside the casing 3 is prevented from being dissipated to the outside, and the interior of the casing 3 can be maintained at high temperature. Since the first preheater 12 is provided, the heat insulator 21 and the vacuum heat insulator 22 can be reduced in thickness, and the high-temperature operating fuel cell system 100 can be reduced in size.

(Control in Power Generation Operation Stopping Sequence)

Next, control in a power generation operation stopping sequence by the controller 27 will be described. The controller 27 controls the components included in the high-temperature operating fuel cell system 100, and no particular limitation is imposed on the controller 27, so long as it has a control function. The controller 27 can be implemented by, for example, a microcontroller, an MPU, a PLC (Programmable Logic Controller), a logical circuit, etc. The controller 27 may include a single controller that performs centralized control or may include a plurality of controllers that co-operate to perform distributed control. The controller 27 includes a storage (not shown) that stores, for example, a temperature history of the vacuum heat insulator 22 described later and is connected to an annunciator 41 for notification of various instructions, information, etc.

In the high-temperature operating fuel cell system 100, when a determination is made that the power generation operation has stopped, the controller 27 controls the oxidant gas feeder 25 to supply the oxidant gas to the first preheater 12. Specifically, the controller 27 determines, based on the detection result from the sensor 40, whether or not the power generation operation has stopped. When a determination is made that the power generation operation has stopped, the controller 27 controls the oxidant gas feeder 25 to supply the oxidant gas so that the temperature of the vacuum heat insulator 22 is equal to or lower than a prescribed temperature. Therefore, even when the temperature inside the casing 3 is high at the time of stopping of the power generation operation, the vacuum heat insulator 22 can be maintained at the prescribed temperature or lower (e.g., 100° C. or lower).

In the high-temperature operating fuel cell system 100, the stopping of the power generation operation may be, for example, normal stopping of the power generation operation in the power generation operation stopping sequence according to instructions by the operator. The stopping of the power generation operation may be, for example, emergency stopping of the power generation operation in case of emergency such as the occurrence of an earthquake. Examples of the emergency stopping of the power generation operation include: stopping of the power generation operation caused by stopping of the combustion operation of the combustor 7; and stopping of the power generation operation caused by stopping of the supply of the reformed gas due to, for example, a failure of the power generation raw material feeder 26.

The sensor 40 detects information indicating the stopping of the power generation operation of the fuel cell stack. Any sensor 40 may be used so long as it can detect the cause of the stopping of the power generation operation. Specifically, the detection target detected by the sensor 40 may vary depending on the cause of the stopping of the power generation operation. In FIG. 1, for the sake of convenience of description, the sensor 40 is illustrated as a temperature sensor disposed on the inner surface of the vacuum heat insulator 22, but the arrangement and type of the sensor 40 are not limited thereto.

For example, in normal stopping of the power generation operation, the sensor 40 may be a temperature sensor that detects the temperature of the vacuum heat insulator 22. This sensor 40 (temperature sensor) may be a temperature sensor disposed on the inner surface of the vacuum heat insulator 22 or may be a temperature sensor disposed in a given portion of the casing 3 at which a temperature correlated with the temperature of the inner surface of the vacuum heat insulator 22 can be detected. When the sensor 40 (temperature sensor) is not disposed on the inner surface of the vacuum heat insulator 22, a table showing the correspondence between the temperature detected by the sensor 40 (temperature sensor) and the temperature of the inner surface of the vacuum heat insulator 22 is stored in advance in a storage (not shown). Then the controller 27 may consult the table stored in the storage to determine the temperature of the inner surface of the vacuum heat insulator 22.

Suppose, for example, that the sensor 40 is a temperature sensor. In this case, when the sensor 40 determines, based on the detection result from the sensor 40, that the power generation operation has stopped, the controller 27 controls the oxidant gas feeder 25 as follows. When a determination is made that the temperature detected by the sensor 40 (temperature sensor) is equal to or higher than the prescribed temperature, the controller 27 controls the oxidant gas feeder 25 such that the oxidant gas is supplied for a prescribed time. The prescribed temperature may be equal to the allowable temperature of the vacuum heat insulator 22 or may be a temperature slightly lower than the allowable temperature. The prescribed time is the time during which the supply of the oxidant gas must be maintained in order that the temperature of the vacuum heat insulator 22 is kept equal to or lower than the allowable temperature. The prescribed time may be determined in advance by, for example, simulations or experiments, and information about the prescribed time may be stored in advance in the storage. Alternatively, the controller 27 may control the oxidant gas feeder 25 such that the oxidant gas is supplied until a determination is made that the temperature of the vacuum heat insulator 22 is equal to or lower than the prescribed temperature.

When the power generation operation is stopped due to stopping of the combustion operation of the combustor 7, the sensor 40 may be a flame detector for detecting a misfire in the combustor 7.

For example, when the sensor 40 is a flame detector, the controller 27 determines, based on the state of the flame detected by the flame detector, whether or not the power generation operation has stopped. When a determination is made that the power generation operation has stopped due to the misfire, the controller 27 controls the oxidant gas feeder 25 such that the oxidant gas is supplied for the prescribed time. Alternatively, the controller 27 may control the oxidant gas feeder 25 such that the oxidant gas is supplied until a determination is made that the temperature of the vacuum heat insulator 22 is equal to or lower than the prescribed temperature.

When the power generation operation is stopped due to stopping of the supply of the reformed gas, the sensor 40 may be, for example, a sensor for detecting whether or not the power generation raw material feeder 26 is operating or may be a flowmeter disposed in the power generation raw material supply passage 8.

For example, when the sensor 40 is a flowmeter or a sensor for detecting whether or not the power generation raw material feeder 26 is operating, the controller 27 determines, based on the detection result from the sensor or the measurement result from the flowmeter, whether or not the power generation raw material feeder 26 is operating. Then the controller 27 determines, based on the determination as to whether or not the power generation raw material feeder 26 is operating, whether or not the power generation operation has stopped. When a determination is made that the power generation operation has stopped, the controller 27 controls the oxidant gas feeder 25 such that the oxidant gas is supplied for the prescribed time. Alternatively, the controller 27 may control the oxidant gas feeder 25 such that the oxidant gas is supplied until a determination is made that the temperature of the vacuum heat insulator 22 is equal to or lower than the prescribed temperature.

When a determination is made that the power generation operation of the fuel cell stack 1 has stopped, the controller 27 instructs the oxidant gas feeder 25 to supply the oxidant gas to the first preheater 12. However, in some cases, the electricity supply to the oxidant gas feeder 25 has been interrupted. In these cases, the controller 27 controls the oxidant gas feeder 25 such that it is operated using electric power generated by the fuel cell stack 1 or electric power stored in an external auxiliary power supply (not shown).

One possible cause of the interruption of the electricity supply to the oxidant gas feeder 25 is a power failure in the high-temperature operating fuel cell system 100. The interruption of the electricity supply may also occur when electric power cannot be supplied to the oxidant gas feeder 25 for some reason. For example, when electric power is not supplied to the oxidant gas feeder 25 because of a power failure, a power generation maintaining function (independent power generating function) of the high-temperature operating fuel cell system 100 that is used in case of a power failure is actuated to maintain the power generation of the fuel cell stack 1, and the electric power generated can be supplied to the oxidant gas feeder 25.

When the sensor 40 is a temperature sensor disposed in the vacuum heat insulator 22 as shown in FIG. 1, the sensor 40 may have both the function of detecting information indicating the stopping of the power generation operation and the function of detecting the temperature of the vacuum heat insulator 22, or an additional temperature sensor different from the sensor 40 may be provided. In any case, the controller 27 may determine changes in the temperature of the vacuum heat insulator 22 using the temperature detected by the temperature sensor and store, in the storage (not shown), history information about the changes in the temperature in the stopping sequence of the high-temperature operating fuel cell system 100. In this structure, the controller 27 may determine, based on the history information stored in the storage, whether or not replacement of the vacuum heat insulator 22 is necessary and may send the result of the determination to the annunciator 41.

For example, when the history information shows that the total time during which the temperature of the vacuum heat insulator 22 exceeded the allowable temperature is equal to or longer than a prescribed time or the number of times the temperature of the vacuum heat insulator 22 exceeded the allowable temperature is equal to or more than a prescribed number of times, the controller 27 may make a determination that replacement of the vacuum heat insulator 22 is necessary.

When the annunciator 41 displays and shows the result of the determination as to whether or not replacement of the vacuum heat insulator 22 is necessary, the annunciator 41 may be a display. When voice is used for notification of the result of the determination as to whether or not replacement of the vacuum heat insulator 22 is necessary, the annunciator 41 may be a speaker. When printing is used for notification of the result of the determination as to whether or not replacement of the vacuum heat insulator 22 is necessary, the annunciator 41 may be a printer. The annunciator 41 may be a lamp that can change its lighting state to indicate the result of the determination as to whether or not replacement of the vacuum heat insulator 22 is necessary. The annunciator 41 may be a communication device that transmits the result of the determination as to whether or not replacement of the vacuum heat insulator 22 is necessary to, for example, a management facility managing the high-temperature operating fuel cell system 100. The communication device may be a wireless communication device or a wired communication device.

With the above structure, a worker who maintains the high-temperature operating fuel cell system 100 can replace the vacuum heat insulator 22 at an appropriate timing, and therefore the cost of parts and the cost of work can be significantly reduced.

When the annunciator 41 indicates information indicating that replacement of the vacuum heat insulator 22 is necessary, the vacuum heat insulator 22 is replaced. Preferably, the vacuum heat insulator 22 is detachably disposed so as to be replaceable without disassembling the high-temperature operating fuel cell system 100.

The phrase "replaceable without disassembling the high-temperature operating fuel cell system 100" means that the vacuum heat insulator 22 can be replaced without detaching components such as a pipe and the casing 3 included in the high-temperature operating fuel cell system 100 and without relocating them.

For example, the vacuum heat insulator 22 may be disposed and cover the first preheater 12 so as to be wound around the outer surface of the first preheater 12. For example, when a container space containing the vacuum heat insulator 22 is formed in the high-temperature operating fuel cell system 100, a lid, for example, is removed to allow access to the container space, and then the vacuum heat insulator 22 is replaced.

With the above structure, when the performance of the vacuum heat insulator 22 deteriorates because of the expiration of its service life or an increase in the temperature inside the casing 3 due to stopping of the power generation by the fuel cell stack 1, the vacuum heat insulator 22 can be replaced in a short time at low cost.

(Flows of Fluids in High-Temperature Operating Fuel Cell System)

The flows of fluids (the oxidant gas, the cathode off-gas, the reformed gas, and the anode off-gas) in the high-temperature operating fuel cell system 100 will be described.

In the high-temperature operating fuel cell system 100, the power generation raw material feeder 26 supplies the power generation raw material and water to the evaporator 4 and the reformer 5 at a prescribed flow rate through the power generation raw material supply passage 8 in response to a control signal from the controller 27. For the sake of convenience of description, the power generation raw material feeder 26 supplies the power generation raw material and water at a prescribed flow rate. However, a water feeder may be provided separately from the power generation raw material feeder 26, and water may be supplied to the evaporator 4 through a reformed water passage different from the power generation raw material supply passage 8.

The water supplied is converted to water vapor in the evaporator 4 by the heat of the exhaust gas flowing through the exhaust gas passage 19, and a gas mixture of the water vapor and the raw material is supplied to the reformer 5. The gas mixture supplied is used to allow the reforming reaction to proceed in the reformer 5 to thereby generate the reformed gas (anode gas). The reformed gas generated in the reformer 5 is supplied through the reformed gas passage 9 to the fuel cell stack 1 contained in the fuel cell stack container 2. The heat of combustion in the combustor 7 and the heat of the exhaust gas flowing through the exhaust gas passage 19 are used as the heat necessary for the reforming reaction in the reformer 5 and the heat necessary for vaporization of water in the evaporator 4.

Specifically, in the high-temperature operating fuel cell system 100 according to embodiment 1, the reformer 5 is disposed below the evaporator 4, and the evaporator 4 and the reformer 5 are disposed above the combustor 7 or above the outer circumference of the combustor 7. The reformer 5 is heated by the heat of combustion in the combustor 7 and the heat of the exhaust gas, and the evaporator 4 located above the reformer 5 is heated by the heat of the exhaust gas. The exhaust gas passage 19 is disposed between the second preheater 14 and the evaporator 4 and between the second preheater 14 and the reformer 5. The exhaust gas flowing through the exhaust gas passage 19 heats the reformer 5 and the evaporator 4, and part of the heat of the exhaust gas is thereby lost. Then the heat of the exhaust gas is further removed by heat exchange with the oxidant gas flowing through the second preheater 14, and the resulting exhaust gas is discharged to the outside.

In the high-temperature operating fuel cell system 100, the oxidant gas feeder 25 supplies the oxidant gas (air) to the first preheater 12 at a prescribed flow rate through the oxidant gas supply passage 11 in response to a control signal from the controller 27. When the oxidant gas supplied to the first preheater 12 flows through a flow passage in the first preheater 12, the oxidant gas is preheated by the heat transferred from the casing 3 to the first preheater 12 through the heat insulator 21. In other words, the heat dissipated from the casing 3 to the outside can be recovered by the oxidant gas flowing through the first preheater 12. The heat transferred from the casing 3 is exchanged with the oxidant gas flowing through the first preheater 12, and this causes the temperature of the oxidant gas to increase from the outside air temperature to about 100° C.

As described above, since the heat dissipating from the casing 3 to the outside can be recovered by the oxidant gas flowing through the first preheater 12, the surface temperature of the heat insulator 21 in contact with the inner surface of the first preheater 12 can be reduced to about 200° C. to about 400° C. In addition, the surface temperature of the vacuum heat insulator 22 in contact with the outer surface of the first preheater 12 can be reduced to 200° C. or lower.

The oxidant gas preheated in the first preheater 12 is supplied to the second preheater 14 through the oxidant gas supply passage 13 for the casing. In the second preheater 14, the oxidant gas is further preheated by heat exchange with the exhaust gas whose heat has been partially used for the reforming reaction in the reformer 5 and vaporization of water in the evaporator 4. The exhaust gas whose heat has been further partially removed by heat exchange with the oxidant gas in the second preheater 14 is discharged to the outside through the exhaust gas passage 19.

As described above, the preheated oxidant gas flowing into the second preheater 14 can recover heat from the exhaust gas flowing through the casing 3 of the high-temperature operating fuel cell system 100.

The oxidant gas preheated in the second preheater 14 flows into the fuel cell stack container 2 through the first oxidant gas passage 15 and is introduced into the third preheater 16. In the third preheater 16, the oxidant gas preheated in the first preheater 12 and the second preheater 14 exchanges heat with the cathode off-gas discharged from the fuel cell stack 1. The oxidant gas is further preheated by heat exchange in the third preheater 16. The preheated oxidant gas is introduced into the fuel cell stack 1 through the second oxidant gas passage 17. As described above, the oxidant gas preheated in the second preheater 14 and flowing into the third preheater 16 can recover heat from the cathode off-gas. Then the oxidant gas having a desired temperature can be supplied to the fuel cell stack 1. This allows stable thermal independence to be achieved, and the power generation efficiency of the high-temperature operating fuel cell system 100 can be improved significantly.

The fuel cell stack 1 generates electric power through the electrochemical reaction of the reformed gas supplied and the oxidant gas supplied. The cathode off-gas containing the oxidant gas unused for power generation and the anode off-gas containing the reformed gas unused for power generation are discharged from the fuel cell stack 1. The cathode off-gas is discharged from the fuel cell stack 1 to the fuel cell stack container 2, exchanges heat with the oxidant gas flowing through the third preheater 16 as described above, and is then guided to the combustor 7.

The anode off-gas discharged from the fuel cell stack 1 is supplied to the injector 6 through the anode off-gas passage 10 and injected into the combustor 7 through the injector 6. In the combustor 7, the anode off-gas is ignited by an ignitor (not shown) and combusted together with the cathode off-gas. (Control of flow rate and temperature of exhaust gas during power generation)

In the high-temperature operating fuel cell system 100 according to embodiment 1, the evaporator 4, the reformer 5, and the second preheater 14 are disposed above the combustor 7. Therefore, the high-temperature exhaust gas can heat the evaporator 4, the reformer 5, and the oxidant gas flowing through the second preheater 14 to temperatures suitable for their functions.

The flow rate and temperature of the exhaust gas generated in the combustor 7 can be controlled by the controller 27. Specifically, the controller 27 controls the power generation raw material feeder 26, the oxidant gas feeder 25, etc. based on the ratio of the fuel used in the fuel cell stack. The ratio of the fuel used is the ratio of the fuel (reformed gas) consumed in the fuel cell stack 1 through the power generation reaction. Specifically, in response to the control signal from the controller 27, the oxidant gas feeder 25 controls the amount of the oxidant gas supplied, and the power generation raw material feeder 26 controls the amounts of the power generation raw material and water supplied, whereby the flow rate and temperature of the exhaust gas obtained by combustion in the combustor 7 can be controlled. During the power generation by the high-temperature operating fuel cell system 100 according to embodiment 1, the ratio of the fuel used is set such that, for example, the fuel cell stack 1 is heated within the temperature range of about 600 to about 900° C. by the heat of combustion in the combustor 7 and radiant heat.

The evaporator 4 and the reformer 5 are heated by the heat of the exhaust gas generated in the combustor 7. In this case, part of the heat of the exhaust gas is consumed. The exhaust gas whose heat has been partially consumed exchanges heat with the oxidant gas flowing through the second preheater 14. Therefore, the heat of the exhaust gas is further removed, and the resulting exhaust gas is cooled to a temperature suitable for discharge to the outside. Specifically, although the temperature of the exhaust gas generated in the combustor 7 is high, e.g., about 600° C. to about 900° C., the heat of the exhaust gas is utilized to heat the evaporator 4 and the reformer 5 and to heat the oxidant gas flowing through the second preheater 14, and therefore the temperature of the exhaust gas is reduced sufficiently when the exhaust gas reaches the outlet of the exhaust gas passage 19.

In particular, when the fuel cell stack 1 generates an electric power of, for example, 1 kW, it is necessary to supply the oxidant gas at 50 L/min or more from the outside. It is also necessary to increase the temperature of the oxidant gas from the outside air temperature to about 400 to about 800° C. during passage through the first preheater 12, the second preheater 14, and the third preheater 16 before the oxidant gas is supplied to the fuel cell stack 1. To preheat the oxidant gas to the suitable temperature, a large amount of heat is necessary. Therefore, the temperature of the exhaust gas flowing through the exhaust gas passage 19 is sufficiently reduced by heat exchange with the oxidant gas in the second preheater 14 when the exhaust gas reaches the outlet of the exhaust gas passage 19.

As described above, the temperature of the exhaust gas is controlled such that the exhaust gas discharged from the outlet of the exhaust gas passage 19 has the desired temperature, in consideration of the amount of heat absorbed by the evaporator 4 and the reformer 5, the amount of heat absorbed by the second preheater 14, etc. The exhaust gas discharged from the high-temperature operating fuel cell system 100 may exchange heat with water to generate hot water, and the hot water may be stored in a hot water tank. With this structure, the heat generated in the high-temperature operating fuel cell system 100 can be more effectively utilized. When the hot water is generated by heat exchange between the exhaust gas and water, it is preferable that the temperature of the exhaust gas discharged to the outside through the exhaust gas passage 19 falls within the range of 150° C. to 200° C.

In the high-temperature operating fuel cell system 100, by changing the amount of the oxidant gas supplied, the heat recovery performance of each of the first preheater 12, the second preheater 14, and the third preheater 16 can be changed. By changing the heat recovery performance of each of these preheaters, the heat insulating performance of the high-temperature operating fuel cell system 100 can also be changed.

Therefore, in the high-temperature operating fuel cell system 100, by controlling the heat recovery performance of each of the first preheater 12 to the third preheater 16 according to the operating conditions, optimal operating conditions can be maintained. For example, to increase the power generation efficiency of the high-temperature operating fuel cell system 100, the amount of the oxidant gas supplied is increased to increase the heat recovery performance of each of the first preheater 12, the second preheater 14, and the third preheater 16. For example, when the reformer 5, the evaporator 4, the fuel cell stack 1, etc. are heated excessively, the amount of the oxidant gas supplied is reduced to reduce the heat recovery performance of each of the preheaters, in order to increase the amount of heat dissipated from the inside of the high-temperature operating fuel cell system 100 to the outside.

(Effects of Structure Including First Preheater)

Next, the effects of the first preheater 12 provided will be described by comparing a structure including the first preheater 12 disposed between the heat insulator 21 and the vacuum heat insulator 22 with a structure including no first preheater 12.

In one possible structure, the vacuum heat insulator 22 is formed of a so-called VIP having high heat insulating performance, and the heat insulator 21 formed of a general-purpose heat-insulating material such as glass wool or a special heat-resistant heat-insulating material is covered directly with the vacuum heat insulator 22 with no first preheater 12 between these insulators. In this structure, since the thermal conductivity of the vacuum heat insulator 22 is excessively small, the temperature on the inner surface of the vacuum heat insulator 22 may increase excessively and exceed the allowable temperature of the vacuum heat insulator 22. To maintain the temperature on the inner surface of the vacuum heat insulator 22 within the allowable temperature range of the vacuum heat insulator 22, it is necessary to increase the thickness of the heat insulator 21 to thereby improve the heat insulating performance of the heat insulator 21. In this case, the thickness of the heat insulator 21 may cause the size and cost of the high-temperature operating fuel cell system 100 to significantly exceed its design specifications. Generally, when the thermal conductivities of two heat-insulating materials differ by a factor of 20, the thicknesses of these heat-insulating materials that are necessary to obtain the same temperature distribution differ by a factor of 20.

Figure 2:
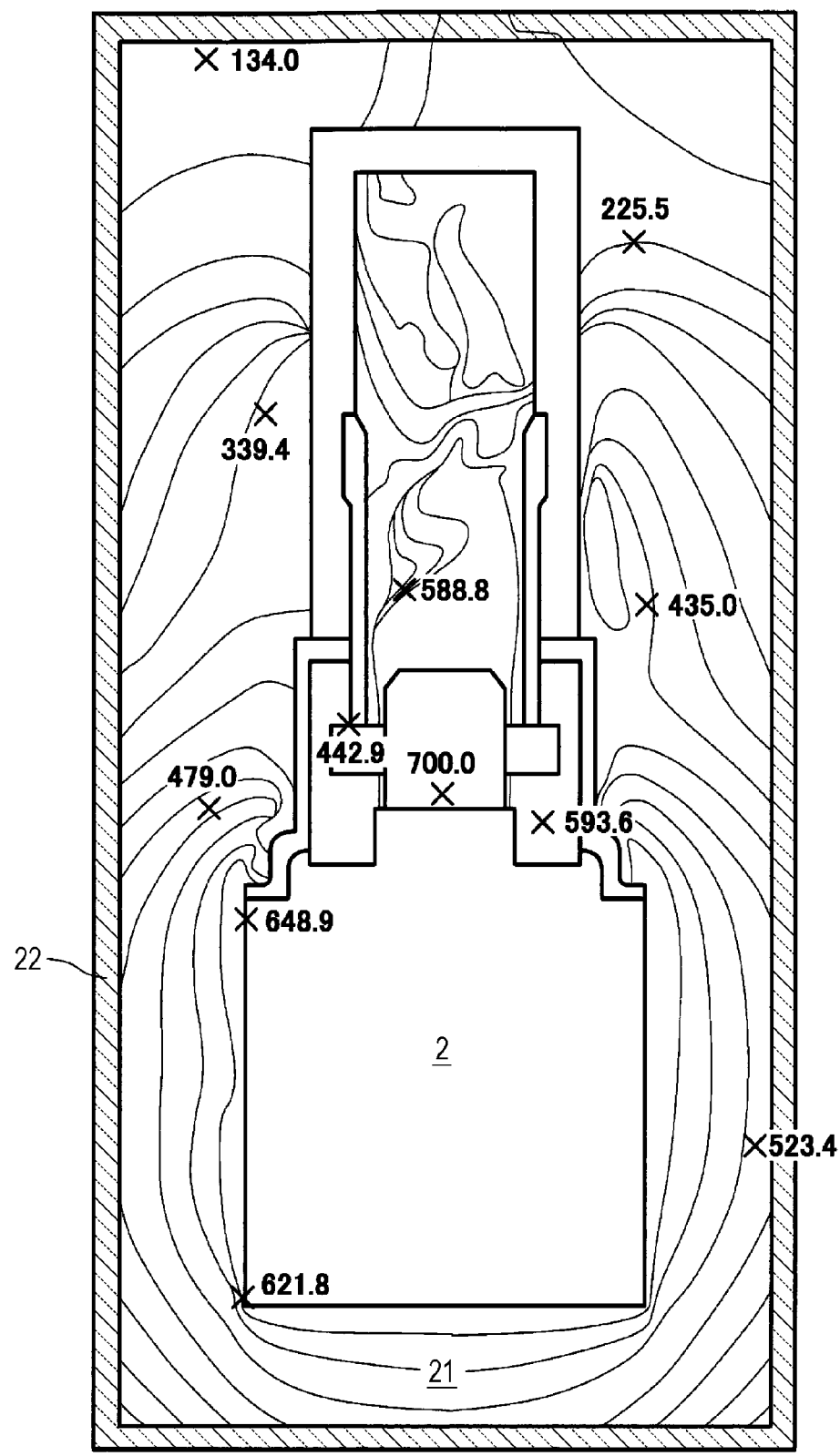
FIG. 2 is an illustration showing an example of the temperature distribution in a structure in which the high-temperature operating fuel cell system shown in FIG. 1 includes no first preheater.
Figure 3:
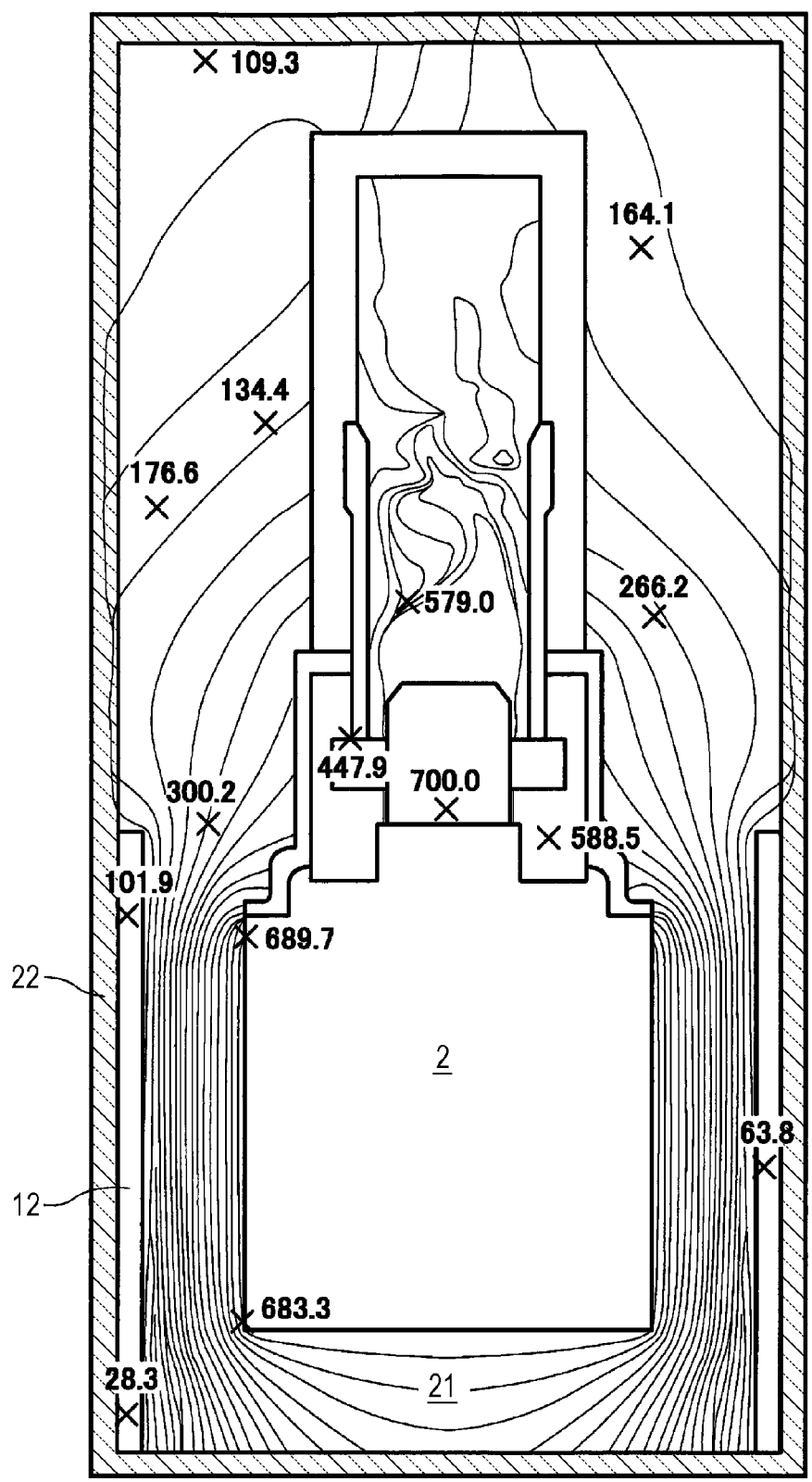
FIG. 3 is an illustration showing an example of the temperature distribution in a structure in which the high-temperature operating fuel cell system shown in FIG. 1 includes a first preheater.

Referring next to FIGS. 2 and 3, a description will be given of the difference in temperature distribution between a high-temperature operating fuel cell system 100 including the first preheater 12 and a high-temperature operating fuel cell system 100 including no first preheater 12. In these fuel cell systems, the thicknesses of their heat insulators 21 are the same. FIG. 2 is an illustration showing an example of the temperature distribution when the high-temperature operating fuel cell system 100 shown in FIG. 1 includes no first preheater 12. FIG. 3 is an illustration showing an example of the temperature distribution when the high-temperature operating fuel cell system 100 shown in FIG. 1 includes the first preheater 12. The temperature distributions shown in FIGS. 2 and 3 were determined by thermal fluid analysis (CFD). In this case, the thermal conductivity of the vacuum heat insulator 22 was set to 0.0012 W/mk.

As shown in FIGS. 2 and 3, when no first preheater 12 is provided, the temperature on the inner surface of the vacuum heat insulator 22 exceeds 450° C. When the first preheater 12 is provided, the temperature on the inner surface of the vacuum heat insulator 22 is reduced to 160° C. or lower. The above results show that, when the high-temperature operating fuel cell system 100 includes the first preheater 12, the temperature of the vacuum heat insulator 22 falls within its allowable temperature range. By providing the first preheater 12, the amount of heat dissipated from the high-temperature operating fuel cell system 100 that generates an electric power of about 700 W can be reduced by about 70 W.

(Outer Shape of High-Temperature Operating Fuel Cell System)

In the high-temperature operating fuel cell system 100, an inner portion above the combustor 7 within the casing 3 is surrounded by the second preheater 14, and an inner portion below the combustor 7 is surrounded by the third preheater 16. The second preheater 14 and the third preheater 16 are separate members. However, this is not a limitation, and the second preheater 14 and the third preheater 16 may be integrally formed. When the second preheater 14 and the third preheater 16 are formed integrally with each other, the third preheater 16 is disposed not on the inner side wall(s) of the fuel cell stack container 2 but on its outer side wall(s).

When the oxidant gas can be sufficiently preheated to a desired temperature in the first preheater 12, only one of the second preheater 14 and the third preheater 16 may be provided, or none of them may be provided.

The general shape of the casing 3 of the high-temperature operating fuel cell system 100 may be a vertically extending cylindrical shape or a vertically extending cuboidal shape. The cross-sectional dimensions of an upper portion above the combustor 7 may differ from the cross-sectional dimensions of a lower portion below the combustor 7. The upper portion may have a cylindrical shape, and the lower portion may have a cuboidal shape. The upper portion may have a cuboidal shape, and the lower portion may have a cylindrical shape. When the casing 3 of the high-temperature operating fuel cell system 100 has a cylindrical shape, its top and bottom surfaces may each have a circular shape, an elliptical shape, or a running track shape.

When the casing 3 of the high-temperature operating fuel cell system 100 has a cylindrical shape, the area of the outermost surface can be smaller than that when the casing 3 has a cuboidal shape. This is advantageous because the fuel cell system 100 can be reduced in size and the amount of heat dissipated to the outside can be reduced. When the casing 3 has a cylindrical shape, its side surface can be formed by bending a plate material and welding its edges together. Therefore, the number of welding portions can be reduced, and the cost can also be reduced.

(Modifications)

Figure 4:
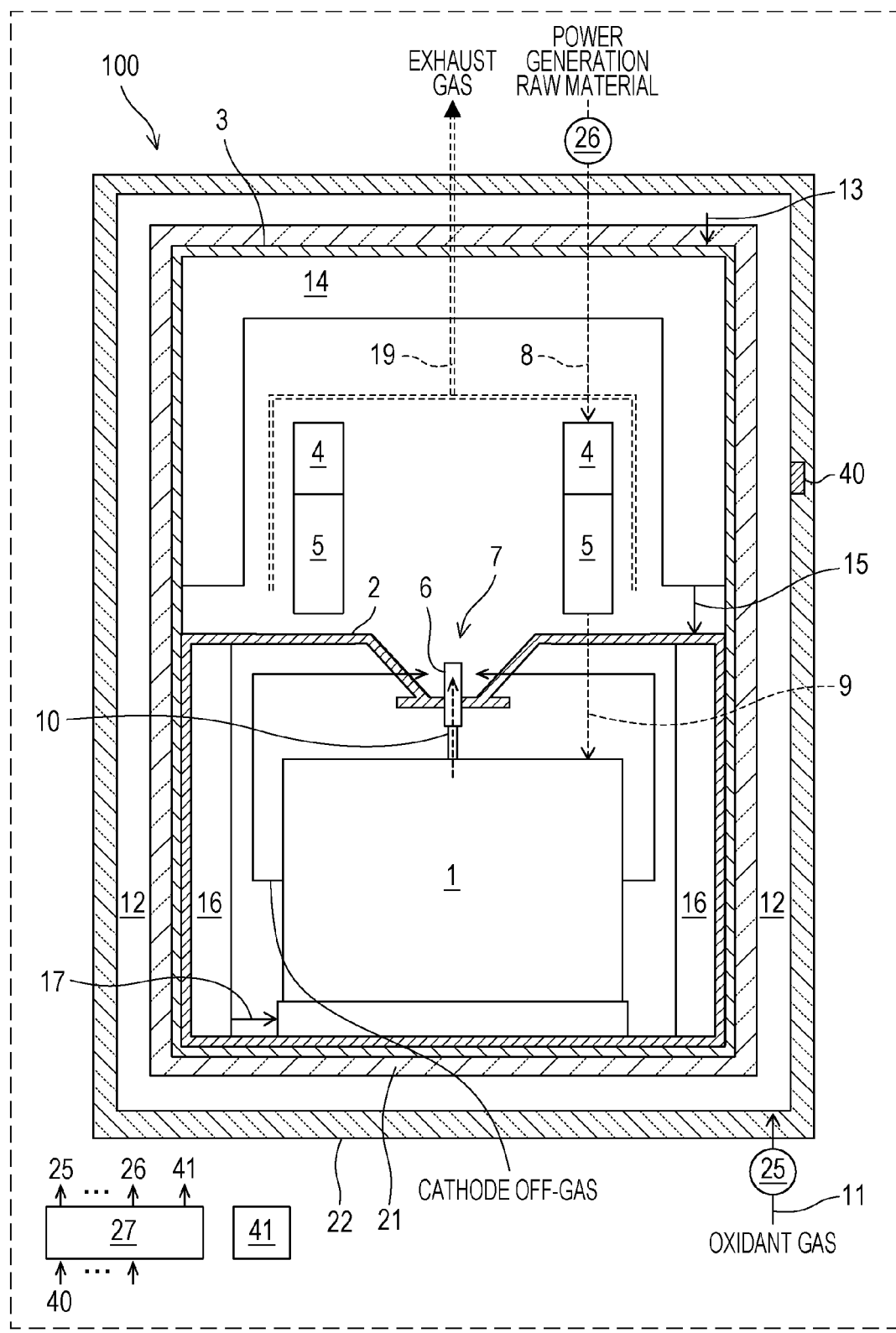
FIG. 4 is a schematic illustration showing an example of a principal structure of a high-temperature operating fuel cell system according to modification 1 of embodiment 1.

In the high-temperature operating fuel cell system 100, the first preheater 12, the heat insulator 21, and the vacuum heat insulator 22 are disposed on the side surface(s) of the casing 3 of the high-temperature operating fuel cell system 100, but this is not a limitation. The first preheater 12, the heat insulator 21, and the vacuum heat insulator 22 may cover, in addition to the side surface(s), both the bottom and top surfaces of the casing 3 as shown in FIG. 4 or only one of the bottom and top surfaces. FIG. 4 is a schematic illustration showing an example of a principal structure of a high-temperature operating fuel cell system 100 according to modification 1 of embodiment 1. FIG. 4 shows the principal structure of the high-temperature operating fuel cell system 100 according to modification 1 of embodiment 1 when the fuel cell system 100 is viewed from a side. The fuel cell system 100 may have a cylindrical shape or a cuboidal shape with the lower surface in the drawing sheet serving as a bottom surface and the upper surface serving as a top surface. The high-temperature operating fuel cell system 100 according to modification 1 of embodiment 1 has the same structure as the high-temperature operating fuel cell system 100 according to embodiment 1 except that not only the side surface(s) of the casing 3 but also its upper and bottom surfaces are covered with the first preheater 12, the heat insulator 21, and the vacuum heat insulator 22. Therefore, the same parts are denoted by the same numerals, and the description thereof will be omitted.

Figure 5:
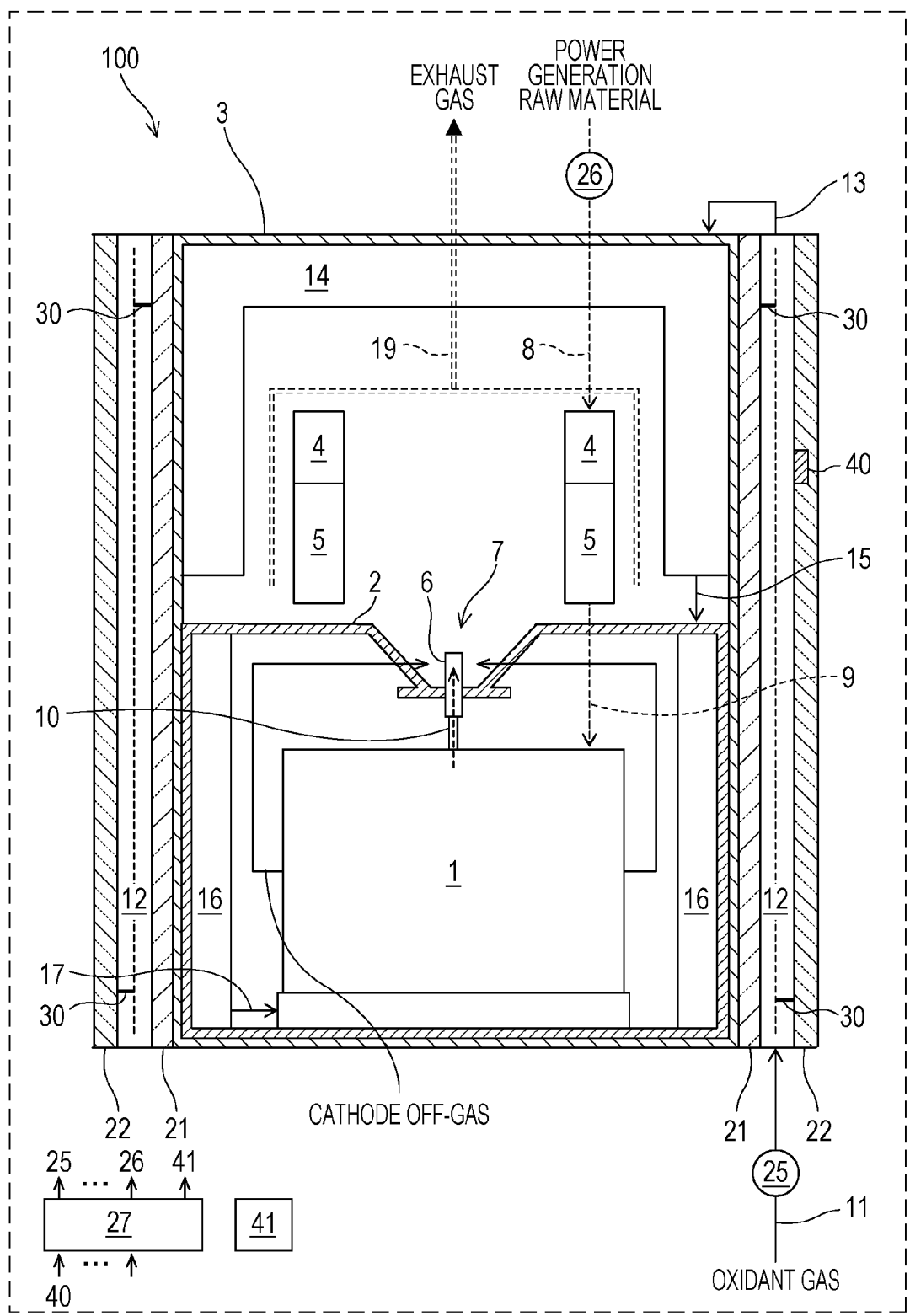
FIG. 5 is a schematic illustration showing an example of a principal structure of a high-temperature operating fuel cell system according to modification 2 of embodiment 1.

In the structure of the high-temperature operating fuel cell system 100 according to embodiment 1, a plurality of dispersing plates 30 may be provided in the flow passage of the oxidant gas within the first preheater 12 in order to improve its heat recovery performance, as shown in FIG. 5. FIG. 5 is a schematic illustration showing an example of a principal structure of a high-temperature operating fuel cell system 100 according to modification 2 of embodiment 1. FIG. 5 shows the principal structure of the high-temperature operating fuel cell system 100 according to modification 2 of embodiment 1 when the fuel cell system 100 is viewed from a side. The fuel cell system 100 may have a cylindrical shape or a cuboidal shape with the lower surface in the drawing sheet serving as a bottom surface and the upper surface serving as a top surface.

The high-temperature operating fuel cell system 100 according to modification 2 of embodiment 1 has the same structure as the high-temperature operating fuel cell system 100 according to embodiment 1 except that the first preheater 12 further includes the plurality of dispersing plate 30. Therefore, the same parts are denoted by the same numerals, and the description thereof will be omitted.

The dispersing plates 30 are plate-shape members that cause the oxidant gas flowing through the first preheater 12 to be turbulent. No particular limitation is imposed on the number and shape of the dispersing plates 30 so long as the number and shape of the dispersing plates 30 are sufficient to cause appropriate turbulence of the oxidant gas flowing through the first preheater 12. By disposing the dispersing plates 30 in the flow passage of the first preheater 12, the thermal conductivity by the oxidant gas flowing through the first preheater 12 can be improved, and the heat recovering ability can thereby be improved.

Embodiment 2

Figure 6:
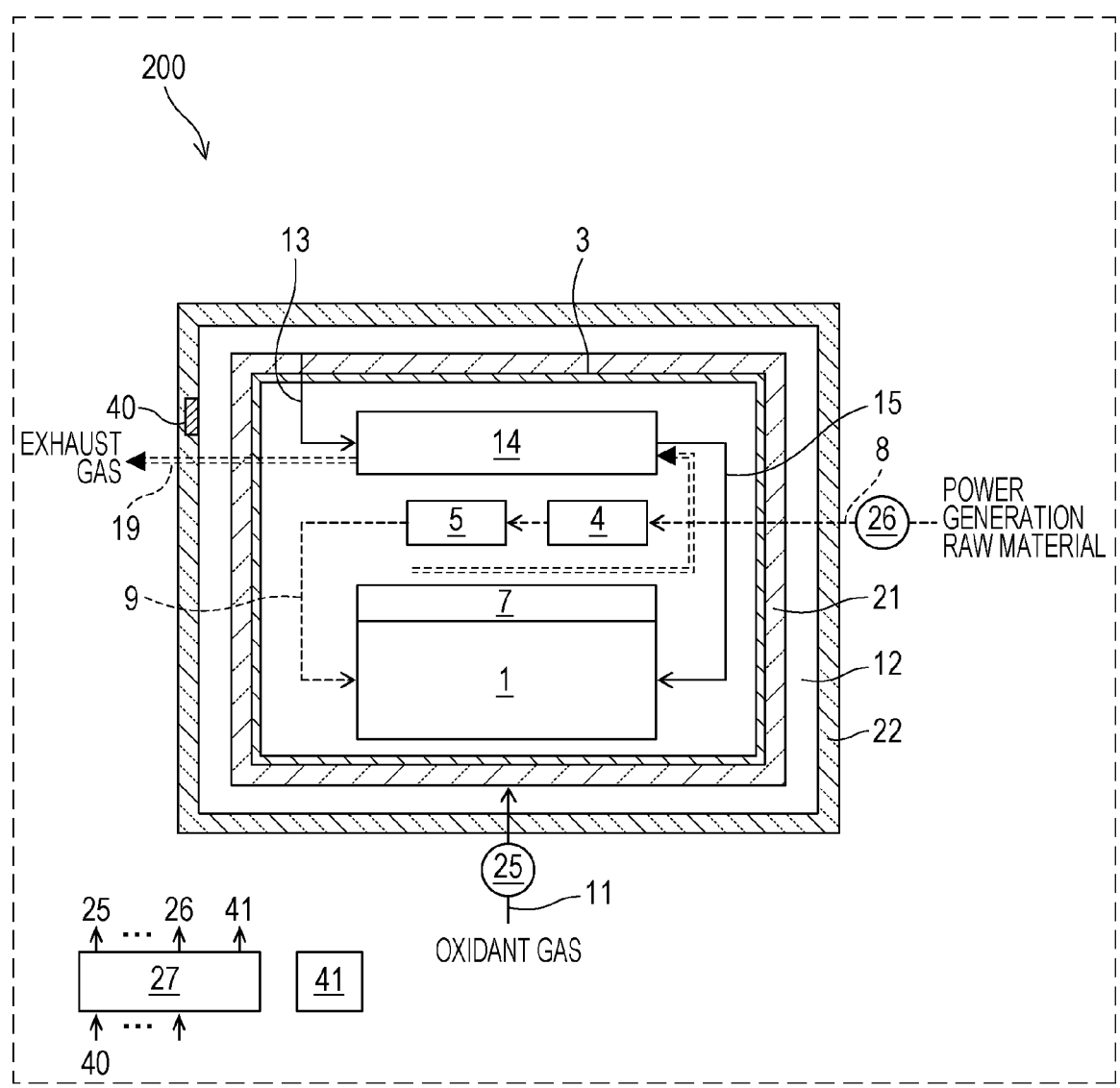
FIG. 6 is a schematic illustration showing an example of a principal structure of a high-temperature operating fuel cell system according embodiment 2 of the present disclosure.

Referring to FIG. 6, a high-temperature operating fuel cell system 200 according to embodiment 2 will be described. FIG. 6 is a schematic illustration showing an example of a principal structure of the high-temperature operating fuel cell system 200 according to embodiment 2 of the present disclosure. FIG. 6 shows the principal structure of the high-temperature operating fuel cell system 200 when it is viewed from a side. The fuel cell system 200 may have a cylindrical shape or a cuboidal shape with the lower surface in the drawing sheet serving as a bottom surface and the upper surface serving as a top surface.

The high-temperature operating fuel cell system 200 according to embodiment 2 is the same as the high-temperature operating fuel cell system 100 according to embodiment 1 except for the following differences. Therefore, the same parts are denoted by the same numerals, and the description thereof will be omitted.

Specifically, in the casing 3 of the high-temperature operating fuel cell system 100 according to embodiment 1, the fuel cell stack 1 is contained in the fuel cell stack container 2, and the third preheater 16 is disposed on the inner side wall(s) of the fuel cell stack container 2. The evaporator 4, the reformer 5, and the second preheater 14 are disposed outside the fuel cell stack container 2. The outer side surface(s) of the casing 3 is(are) covered with the heat insulator 21, the first preheater 12, and the vacuum heat insulator 22.

The high-temperature operating fuel cell system 200 according to embodiment 2 differs from the fuel cell system 100 in that the fuel cell stack container 2 and the third preheater 16 are not provided. The casing 3 of the high-temperature operating fuel cell system 200 according to embodiment 2 has a relatively simple structure. Specifically, the fuel cell stack 1 is disposed in the space in which the evaporator 4, the reformer 5, the combustor 7, the second preheater 14, etc. are disposed. The outer surface of the casing 3 is covered sequentially with the heat insulator 21, the first preheater 12, and the vacuum heat insulator 22. The heat insulator 21 may be disposed not on the outer side of the casing 3 but on the inner side, as in embodiment 1. Alternatively, two heat insulators 21 may be disposed on the inner and outer sides of the casing 3 so as to sandwich the casing 3 therebetween.

In the high-temperature operating fuel cell system 200 according to embodiment 2, the oxidant gas flowing through the first preheater 12 disposed on the outer surface of the casing 3 is used to recover the heat transferred from the casing 3 in order to reduce the amount of heat dissipated from the inside of the casing 3 to the outside. The oxidant gas is thereby preheated.

The oxidant gas preheated in the first preheater 12 is supplied to the second preheater 14 through the oxidant gas supply passage 13 for the casing. In the second preheater 14, the oxidant gas supplied through the oxidant gas supply passage 13 for the casing exchanges heat with the exhaust gas generated in the combustor 7, and the oxidant gas is further preheated to about 400 to about 800° C. Then the preheated oxidant gas is supplied to the fuel cell stack 1 and used for power generation.

As described above, since the oxidant gas supplied to the fuel cell stack 1 through the first preheater 12 and the second preheater 14 can be heated to an appropriate temperature, the stability of the temperature of the fuel cell stack 1 during operation can be increased. In addition, the heat in the casing 3 can be effectively recovered through heat exchange with the oxidant gas in the first preheater 12 and the second preheater 14, so that the power generation efficiency can be improved.

In the high-temperature operating fuel cell system 200 according to embodiment 2, the evaporator 4, the reformer 5, the combustor 7, the second preheater 14, the fuel cell stack 1, etc. are contained in the same space within the casing 3 as described above. In this structure, by disposing the heat insulator 21, the first preheater 12, and the vacuum heat insulator 22 on the outer surface of the casing 3, the high-temperature operating fuel cell system 200 can be reduced in size and improved in power generation efficiency and reliability.

In the high-temperature operating fuel cell system 200 according to embodiment 2, the entire outer surface of the casing 3 is covered with the heat insulator 21, the first preheater 12, and the vacuum heat insulator 22, but this is not a limitation. For example, the heat insulator 21, the first preheater 12, and the vacuum heat insulator 22 may cover only the outer side surface(s) of the casing 3 or may cover only the outer bottom surface. Alternatively, the outer side surface(s) and the outer bottom surface may be covered.

Embodiment 3

Figure 7:
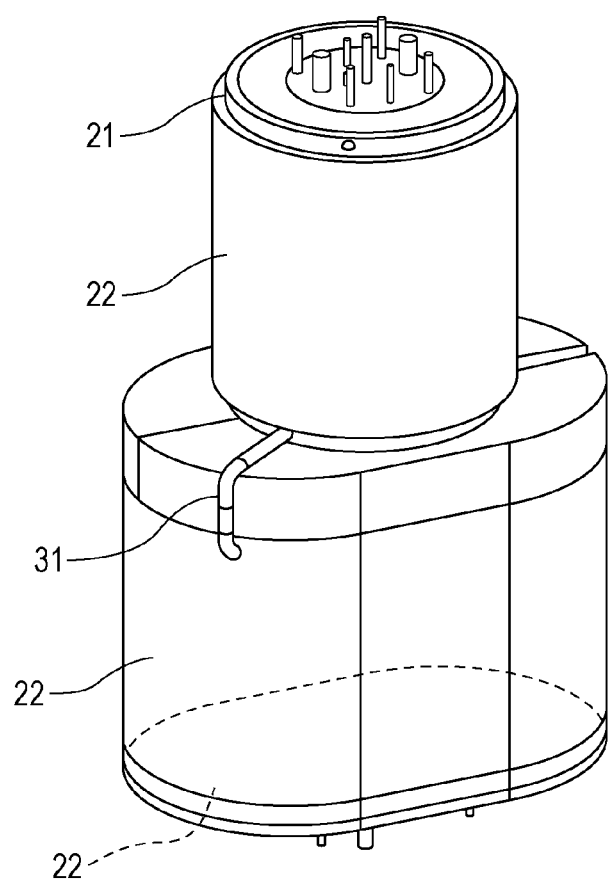
FIG. 7 is a perspective view showing an example of the outer shape of a high-temperature operating fuel cell system according embodiment 3 of the present disclosure.
Figure 8:
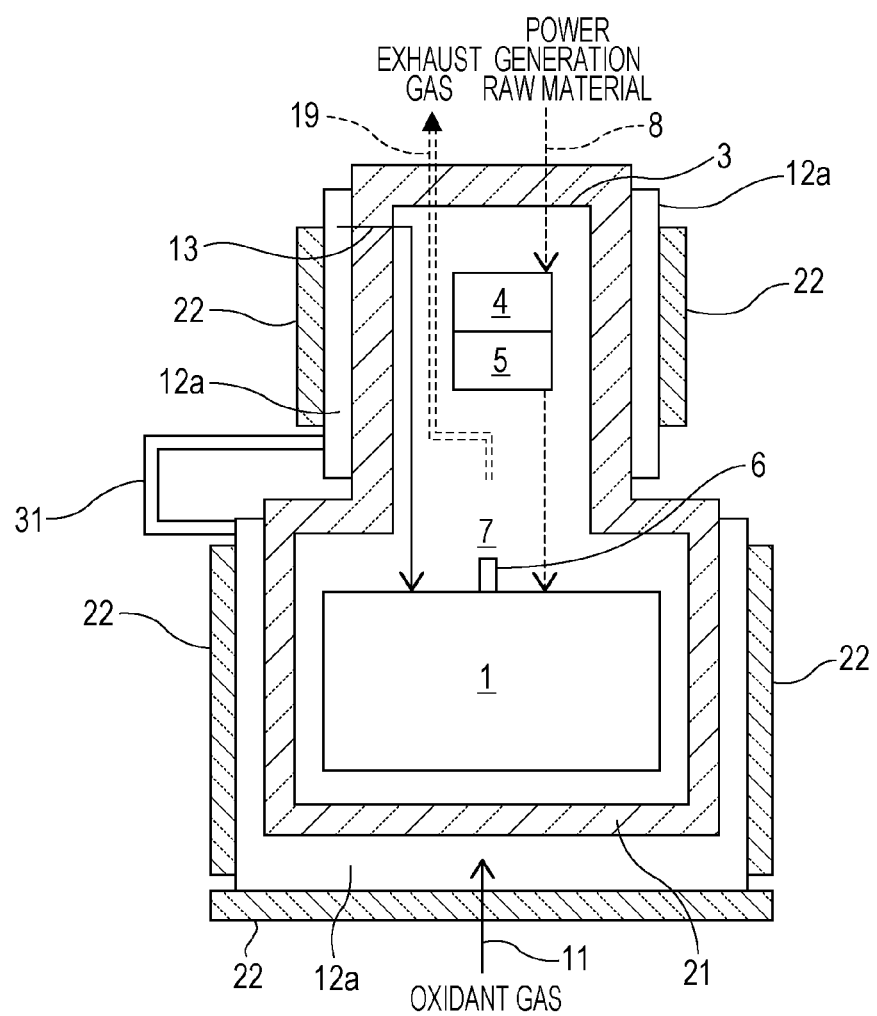
FIG. 8 is a schematic illustration showing an example of a principal structure of the high-temperature operating fuel cell system shown in FIG. 7.

Referring to FIGS. 7 and 8, a high-temperature operating fuel cell system 300 according to embodiment 3 will be described. FIG. 7 is a perspective view showing an example of the outer shape of the high-temperature operating fuel cell system 300 according to embodiment 3 of the present disclosure. FIG. 8 is a schematic illustration showing an example of a principal structure of the high-temperature operating fuel cell system 300 shown in FIG. 7.

The only difference of the high-temperature operating fuel cell system 300 according to embodiment 3 from the high-temperature operating fuel cell system 100 according to embodiment 1 will be described. The same parts are denoted by the same numerals, and the description thereof will be omitted. In FIG. 8, the fuel cell stack container 2, the third preheater 16, the controller 27, and the sensor 40 are not illustrated for the sake of convenience of description.

Specifically, in the high-temperature operating fuel cell system 300 according to embodiment 3, the structures of the first preheater 12 and vacuum heat insulators 22 that cover the first preheater 12 differ from those in the high-temperature operating fuel cell system 100 according to embodiment 1. The first preheater 12 includes: a plurality of preheater sections 12*a* that are disposed in side portions of the fuel cell stack container 2 of the fuel cell stack 1 and cover at least part of the outer surface of the third preheater 16, at least part of the combustor 7, at least part of the outer surface of the reformer 5, and at least part of the outer surface of the evaporator 4; and a connector 31 that connects these separately disposed preheater sections 12*a* such that the oxidant gas can flow between the preheater sections 12*a*. The connector 31 is a tube that connects the preheater sections 12*a* to each other and allows the oxidant gas to pass through.

As shown in FIG. 8, in the high-temperature operating fuel cell system 300 according to embodiment 3, the plurality of preheater sections 12*a* are disposed so as to cover at least part of the outer surface of the heat insulator 21. Since the preheater sections 12*a* are connected through the connector 31, the oxidant gas can flow through each of the plurality of preheater sections 12*a*. A plurality of vacuum heat insulators 22 are disposed, and each vacuum heat insulator 22 covers at least part of the outer surface of one of the preheater sections 12*a*.

As described above, the high-temperature operating fuel cell system 300 according to embodiment 3 includes: the first preheater 12 including the plurality of preheater sections 12*a* having difference sizes and shapes; and the plurality of vacuum heat insulators 22 having difference sizes and shapes. By appropriately disposing the plurality of preheater sections 12*a* and the plurality of vacuum heat insulators 22, the level of the heat insulating performance of the high-temperature operating fuel cell system 300 and the level of its heat recovery performance can be freely adjusted. Therefore, the heat insulating performance and the heat recovery performance can be well-balanced such that the cost, size, and performance of the high-temperature operating fuel cell system 300 are optimized.

There is no design difficulty in disposing a pipe such as the oxidant gas supply passage 11 so as to pass through a space formed in part of one of the vacuum heat insulators 22 as shown in FIG. 8.

From the foregoing description, many modifications and other embodiments are apparent to those skilled in the art. Therefore, the foregoing description is to be construed as illustrative only and is provided for the purpose of teaching those skilled in the art the best mode of carrying out the present disclosure. The details of the structure and/or functions of the present disclosure may be substantially modified without departing from the spirit of the present disclosure.

The present disclosure can be widely used for high-temperature operating fuel cell systems including high-temperature operating fuel cells such as SOFCs and MCFCs that can utilize high-temperature exhaust heat.

What is claimed is:

1. A high-temperature operating fuel cell system comprising:
 a fuel cell stack that includes a cathode and an anode and generates electric power through an electrochemical reaction of an oxidant gas supplied to the cathode and a reformed gas supplied to the anode;
 a combustor that combusts a cathode off-gas discharged from the cathode of the fuel cell stack and an anode off-gas discharged from the anode;
 a heat insulator that surrounds at least part of an outer surface of the fuel cell stack and at least part of the combustor;
 a first preheater that covers at least part of an outer surface of the heat insulator and preheats the oxidant gas to be supplied to the fuel cell stack using heat transferred through the heat insulator;
 an oxidant gas feeder that supplies the oxidant gas to the first preheater;
 a vacuum heat insulator that covers an outer surface of the first preheater, wherein a region in which the heat insulator is disposed is the same as a region in which the first preheater is disposed, and wherein the vacuum heat insulator includes an outer casing and a core member;
 a sensor that detects information indicating stopping of a power generation operation of the fuel cell stack;
 a reformer that generates the reformed gas from a power generation raw material supplied, the reformed gas being generated through a reforming reaction by utilizing heat of an exhaust gas generated by combustion in the combustor;
 a second preheater that preheats the oxidant gas through heat exchange with the exhaust gas whose heat has been partially used for the reforming reaction in the reformer and supplies the preheated oxidant gas to the fuel cell stack;
 a casing that contains the fuel cell stack, the combustor, the reformer, and the second preheater, and
 a controller including a logic circuit,
 wherein the logic circuit is programmed to cause the controller to perform:

determining, based on a detection result from the sensor, whether the power generation operation of the fuel cell stack has stopped, and when it is determined that the power generation has stopped, controlling the oxidant gas feeder to supply the oxidant gas to the first preheater so that the temperature of the vacuum heat insulator is equal to or lower than a prescribed temperature;

wherein the heat insulator is located on an inner or outer surface of the casing and surrounds at least part of the outer surface of the fuel cell stack, at least part of the combustor, at least part of an outer surface of the reformer, and at least part of an outer surface of the second preheater, wherein the reformer is disposed above the combustor, and the fuel cell stack is disposed below the combustor, wherein the high-temperature operating fuel cell system further comprises:

a fuel cell stack container that has a container space containing the fuel cell stack and guides the cathode off-gas discharged from the cathode of the fuel cell stack to the combustor through the container space; and a third preheater that is disposed on a side surface of the fuel cell stack container so as to surround the outer surface of the fuel cell stack and further preheats the oxidant gas preheated in the second preheater using heat of the cathode off-gas flowing through the container space, and wherein the heat insulator surrounds at least part of an outer surface of the third preheater, at least part of the combustor, and at least part of the outer surface of the reformer.

2. The high-temperature operating fuel cell system according to claim 1, wherein:

the sensor is a flame detector configured to detect a misfire, and when the controller detects, based on the detection result from the sensor, that a combustion operation of the combustor has stopped, the controller determines that the power generation operation of the fuel cell stack has stopped.

3. The high-temperature operating fuel cell system according to claim 1, wherein:

the sensor is a flow meter, and when the controller detects, based on the detection result from the sensor, that supply of the reformed gas has stopped, the controller determines that the power generation operation of the fuel cell stack has stopped.

4. The high-temperature operating fuel cell system according to claim 1, wherein, when the controller determines, during supply of the oxidant gas from the oxidant gas feeder to the first preheater, that supply of electric power to the oxidant gas feeder has stopped, the controller operates the oxidant gas feeder using electric power generated by the fuel cell stack or electric power from an external auxiliary power supply.

5. The high-temperature operating fuel cell system according to claim 1, wherein, when the controller determines, based on the detection result from the sensor, that the power generation operation of the fuel cell stack has stopped, the controller controls the oxidant gas feeder such that the oxidant gas is supplied to the first preheater for a prescribed time or until the temperature of the vacuum heat insulator is equal to or lower than the prescribed temperature.

6. The high-temperature operating fuel cell system according to claim 1, wherein the first preheater includes:

a plurality of preheater sections that surround at least part of the outer surface of the third preheater, at least part of the combustor, and at least part of the outer surface of the reformer; and a connector that connects the plurality of preheater sections spaced apart from each other such that the oxidant gas is allowed to flow between the plurality of preheater sections.

7. The high-temperature operating fuel cell system according to claim 1, wherein the oxidant gas flows sequentially through the first preheater, the second preheater, and the third preheater and is then supplied to the fuel cell stack, wherein the first preheater preheats the oxidant gas supplied externally using the heat transferred through the heat insulator, wherein the second preheater preheats the oxidant gas preheated in the first preheater using the heat of the exhaust gas, and wherein the third preheater preheats the oxidant gas preheated in the second preheater using the heat of the cathode off-gas flowing through the container space of the fuel cell stack container.

8. The high-temperature operating fuel cell system according to claim 1, wherein the vacuum heat insulator is detachably disposed so as to be replaceable without disassembling the high-temperature operating fuel cell system.

9. The high-temperature operating fuel cell system according to claim 8, further comprising:

a temperature sensor that detects a temperature corresponding to a change in the temperature of the vacuum heat insulator; and an annunciator, wherein the controller includes a storage that stores a temperature history detected by the temperature sensor, makes a determination, based on the temperature history stored in the storage, as to whether or not replacement of the vacuum heat insulator is necessary, and sends a result of the determination to the annunciator.

10. The high-temperature operating fuel cell system according to claim 9, wherein the temperature sensor is the sensor that detects the information indicating stopping of the power generation operation of the fuel cell stack.

11. A high-temperature operating fuel cell system comprising:

a fuel cell stack that includes a cathode and an anode and generates electric power through an electrochemical reaction of an oxidant gas supplied to the cathode and a reformed gas supplied to the anode;

a combustor that combusts a cathode off-gas discharged from the cathode of the fuel cell stack and an anode off-gas discharged from the anode;

a heat insulator that surrounds at least part of an outer surface of the fuel cell stack and at least part of the combustor;

a first preheater that covers at least part of an outer surface of the heat insulator and preheats the oxidant gas to be supplied to the fuel cell stack using heat transferred through the heat insulator;

an oxidant gas feeder that supplies the oxidant gas to the first preheater;

a vacuum heat insulator that covers at least part of an outer surface of the first preheater;

a sensor that detects information indicating stopping of a power generation operation of the fuel cell stack;

a controller;

a reformer that generates the reformed gas from a power generation raw material supplied, the reformed gas being generated through a reforming reaction by utilizing heat of an exhaust gas generated by combustion in the combustor;

a second preheater that preheats the oxidant gas through heat exchange with the exhaust gas whose heat has been partially used for the reforming reaction in the reformer and supplies the preheated oxidant gas to the fuel cell stack; and a casing that contains the fuel cell stack, the combustor, the reformer, and the second preheater, wherein the heat insulator is located on an inner or outer surface of the casing and surrounds at least part of the outer surface of the fuel cell stack, at least part of the combustor, at least part of an outer surface of the reformer, and at least part of an outer surface of the second preheater, wherein, when the controller determines, based on a detection result from the sensor, that the power generation operation of the fuel cell stack has stopped, the controller controls the oxidant gas feeder to supply the oxidant gas to the first preheater so that the temperature of the vacuum heat insulator is equal to or lower than a prescribed temperature, wherein the reformer is disposed above the combustor, and the fuel cell stack is disposed below the combustor, wherein the high-temperature operating fuel cell system further comprises:

a fuel cell stack container that has a container space containing the fuel cell stack and guides the cathode off-gas discharged from the cathode of the fuel cell stack to the combustor through the container space; and a third preheater that is disposed on a side surface of the fuel cell stack container so as to surround the outer surface of the fuel cell stack and further preheats the oxidant gas preheated in the second preheater using heat of the cathode off-gas flowing through the container space, and wherein the heat insulator surrounds at least part of an outer surface of the third preheater, at least part of the combustor, and at least part of the outer surface of the reformer.

12. The high-temperature operating fuel cell system according to claim 11, wherein the first preheater includes:

a plurality of preheater sections that surround at least part of the outer surface of the third preheater, at least part of the combustor, and at least part of the outer surface of the reformer; and a connector that connects the plurality of preheater sections spaced apart from each other such that the oxidant gas is allowed to flow between the plurality of preheater sections.

13. The high-temperature operating fuel cell system according to claim 11, wherein the oxidant gas flows sequentially through the first preheater, the second preheater, and the third preheater and is then supplied to the fuel cell stack, wherein the first preheater preheats the oxidant gas supplied externally using the heat transferred through the heat insulator, wherein the second preheater preheats the oxidant gas preheated in the first preheater using the heat of the exhaust gas, and wherein the third preheater preheats the oxidant gas preheated in the second preheater using the heat of the cathode off-gas flowing through the container space of the fuel cell stack container.

\* \* \* \* \*